United States Patent
Nakamura et al.

(10) Patent No.: US 10,635,171 B2
(45) Date of Patent: Apr. 28, 2020

(54) DETECTION DEVICE, DETECTION METHOD, CONTROL DEVICE, AND CONTROL METHOD

(71) Applicant: SONY CORPORATION, Tokyo (JP)

(72) Inventors: Hitoshi Nakamura, Tokyo (JP); Noriyuki Suzuki, Chiba (JP); Kensuke Kitamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 331 days.

(21) Appl. No.: 15/502,226

(22) PCT Filed: Jun. 5, 2015

(86) PCT No.: PCT/JP2015/066387
§ 371 (c)(1),
(2) Date: Feb. 7, 2017

(87) PCT Pub. No.: WO2016/038953
PCT Pub. Date: Mar. 17, 2016

(65) Prior Publication Data
US 2017/0235364 A1    Aug. 17, 2017

(30) Foreign Application Priority Data
Sep. 10, 2014   (JP) ................. 2014-184108

(51) Int. Cl.
*G06F 3/01*      (2006.01)
(52) U.S. Cl.
CPC .............. *G06F 3/014* (2013.01); *G06F 3/016* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,388,992 A | * | 2/1995 | Franklin ................. | G06F 3/016 340/407.1 |
| 6,088,017 A | | 7/2000 | Tremblay et al. | |
| 2004/0032346 A1 | * | 2/2004 | Kim ........................ | G06F 3/014 341/20 |

(Continued)

FOREIGN PATENT DOCUMENTS

| EP | 1416360 A2 | 5/2004 |
|---|---|---|
| EP | 2634670 A1 | 9/2013 |

(Continued)

OTHER PUBLICATIONS

Jun. 14, 2018, European Search Report issued for related EP Application No. 15840038.2.

(Continued)

*Primary Examiner* — Deeprose Subedi
(74) *Attorney, Agent, or Firm* — Paratus Law Group, PLLC

(57) ABSTRACT

There is provided a detection device, including: a non-contact sensor unit that detects a shape of a finger; and a mounting unit that mounts the non-contact sensor unit on a hand at a more distal position than a carpal area. Generation of occlusions may be prevented and operations that utilize a shape of user's fingers may be detected more reliably, while a mounted component and an operating procedure may also be simplified.

19 Claims, 10 Drawing Sheets

(56) References Cited

U.S. PATENT DOCUMENTS

| | | | | |
|---|---|---|---|---|
| 2005/0179644 A1* | 8/2005 | Alsio | ............... | G06F 3/014 345/156 |
| 2013/0265149 A1* | 10/2013 | Nakamura | ............ | G06F 3/016 340/407.1 |
| 2015/0022446 A1* | 1/2015 | Asplund | ............... | G06F 3/014 345/157 |

FOREIGN PATENT DOCUMENTS

| | | |
|---|---|---|
| EP | 2733574 A2 | 5/2014 |
| JP | 2000-501033 A | 2/2000 |
| JP | 2000-132305 A | 5/2000 |
| JP | 2004-078966 A | 3/2004 |
| JP | 2004-537802 A | 12/2004 |
| JP | 2012-073830 A | 4/2012 |

OTHER PUBLICATIONS

Mar. 13, 2018, European Search Report issued for related EP Application No. 15840038.2.

May 7, 2019, Chinese Office Action issued for related CN Application No. 201580044968.7.

* cited by examiner

DETECTION DEVICE, DETECTION METHOD, CONTROL DEVICE, AND CONTROL METHOD

CROSS REFERENCE TO PRIOR APPLICATION

This application is a National Stage Patent Application of PCT International Patent Application No. PCT/JP2015/066387 (filed on Jun. 5, 2015) under 35 U.S.C. § 371, which claims priority to Japanese Patent Application No. 2014-184108 (filed on Sep. 10, 2014), which are all hereby incorporated by reference in their entirety.

TECHNICAL FIELD

The present disclosure relates to a detection device, a detection method, a control device, and a control method.

BACKGROUND ART

Many technologies that utilize the shape and motion of a user's fingers to control a device have already been proposed. For example, Patent Literature 1 describes a technology that estimates a hand shape from image data captured by a camera. Also, Patent Literature 2 describes a technology that estimates a hand shape by radiating infrared light from a light source disposed in a wrist area, sensing reflections of the infrared light off the fingers with an infrared camera (imager), and performing image recognition. Also, Patent Literature 3 describes a technology that uses a method such as holding up a hand to a camera and causing particular speech to be recognized to present an intention to input to an equipment side, and start a recognition process. According to the above, when a hand is moved unexpectedly, the misrecognition of a gesture and the execution of an unintended command are prevented. Patent Literature 4 describes a technology that detects an amount of finger curl by wearing a glove with a built-in sensor on the hand.

CITATION LIST

Patent Literature

Patent Literature 1: JP 2005-91085A
Patent Literature 2: US 2014/0098018 A1
Patent Literature 3: JP 2014-89688A
Patent Literature 4: JP 2006-276651A

DISCLOSURE OF INVENTION

Technical Problem

However, in the case of performing image recognition with a camera, like in the technology described in Patent Literature 1, for example, there are blind spots in the recognition range, and the location and range of possible recognition is limited. Also, since an image of the hand is captured by a camera at a distance from the hand, the technology is susceptible to the influence of surrounding environmental lighting, and the image processing load for estimating the shape of the fingers from an image is large. Furthermore, since not only hands but also the user's face and body are also depicted in the image, the user may feel a sense of psychological burden in some cases. Likewise, in the case of the technology described in Patent Literature 2, if the wrist is bent or twisted, there is a possibility that the fingers may enter a blind spot with respect to the light source or the camera, and estimating the hand shape may become difficult. Furthermore, the image recognition process is a process with a comparatively high processing load.

Also, in the case of the technology described in Patent Literature 3, since an operation for indicating the intent to input is required in advance, it takes time until a command is input by a gesture, and it is difficult to make the technology recognize the same gesture consecutively as a command. In the case of the technology described in Patent Literature 4, since the user's entire hand is covered with a glove, it is difficult to combine with other actions, such as operations on a device using elements such as buttons or a touch panel, for example.

Accordingly, the present disclosure proposes a new and improved detection device, detection method, control device, and control method capable of preventing the generation of occlusions and more reliably detecting operations that utilize the shape of the user's fingers, while also simplifying a mounted component and the operating procedure.

Solution to Problem

According to the present disclosure, there is provided a detection device, including: a non-contact sensor unit that detects a shape of a finger; and a mounting unit that mounts the non-contact sensor unit on a hand at a more distal position than a carpal area. By wearing a non-contact sensor on the hand at a more distal position than the carpal area, the fingers may be prevented from entering a blind spot in the detection range of the sensor, even if the carpal area (wrist) bends or twists.

According to the present disclosure, there is provided a detection method, including: mounting, by a mounting unit, a non-contact sensor unit on a hand at a more distal position than a carpal area; and detecting, by the non-contact sensor unit, a shape of a finger.

According to the present disclosure, there is provided a control device, including: an acquisition unit that acquires a signal indicating a shape of a finger, the signal being detected by a non-contact sensor unit mounted on a hand at a more distal position than a carpal area; and a command issuing unit that issues a command corresponding to the shape of the finger.

According to the present disclosure, there is provided a control method, including: acquiring a signal indicating a shape of a finger, the signal being detected by a non-contact sensor unit mounted on a hand at a more distal position than a carpal area; and issuing, by a processor, a command corresponding to the shape of the finger.

Advantageous Effects of Invention

According the present disclosure as described above, it is possible to prevent the generation of occlusions and more reliably detect operations that utilize the shape of the user's fingers, while also simplifying a mounted component and the operating procedure.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1A:
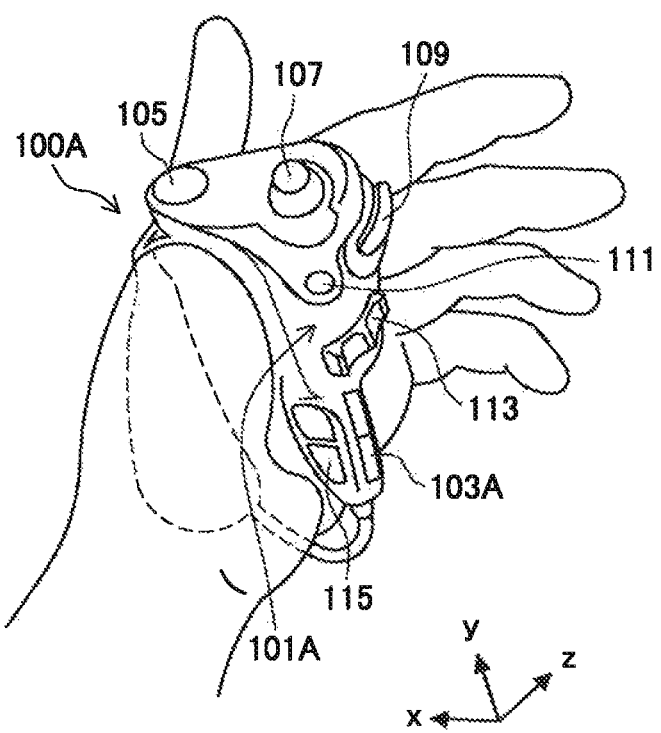
FIG. 1A is a diagram illustrating a first example of a controller according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. First embodiment (example of controller)
2. Second embodiment (example of wearable terminal)
3. Example of functional configuration
4. Other embodiments
5. Hardware configuration
6. Supplement

1. First Embodiment

Figure 1B:
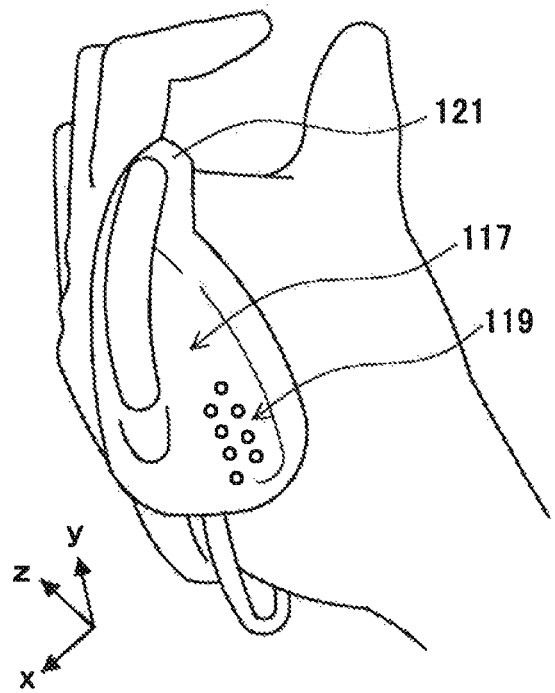
FIG. 1B is a diagram illustrating the first example of the controller according to the first embodiment of the present disclosure.

FIGS. 1A and 1B are diagrams illustrating a first example of a controller according to a first embodiment of the present disclosure. FIG. 1A is a view of the controller from the palm side, while FIG. 1B is a view of the controller from the back-of-the-hand side.

Referring to FIG. 1A, the controller 100A according to the first example is gripped in the user's left hand. On the palm side, the controller 100A includes a grip member 101A, a sensor array 103A, a lamp 105, a stick 107, a wheel 109, a push button 111, a select lever 113, and a grip button 115. Referring to FIG. 1B, on the back-of-the-hand side, the controller 100A includes a backpack 117. A speaker 119 is provided on the backpack 117. The grip member 101A and the backpack 117 are joined by a belt 121. The controller 100A is an example of a detection device according to the present disclosure. Hereinafter, each of the structural elements will be described further.

The grip member 101A is gripped by the user's left hand. The grip member 101A forms a housing in which the sensor array 103A and the like are secured. Consequently, the sensor array 103A is worn on the hand as a result of the grip member 101A being gripped in the user's left hand. More specifically, the grip member 101A mounts the sensor array 103A on the palm side. The grip member 101A (and similarly the grip member 101B described hereinafter) is an example of a mounting unit provided in the controller 100A, which is an example of a detection device according to the present embodiment. Also, the sensor array 103A is an example of a non-contact sensor unit provided in the controller 100A, which is an example of a detection device according to the present embodiment.

The sensor array 103A is secured to the housing formed by the grip member 101A, and is disposed on the palm side when the grip member 101A is gripped by the user's left hand. Also, the sensor array 103A includes one or more optical sensors respectively corresponding to each of one or multiple fingers. The optical sensor is an example of a non-contact sensor. More specifically, the optical sensor includes a light-emitting unit and a light-sensing unit, and by measuring the ratio of light emitted from the light-emitting unit that reflects off a finger and is incident on the light-sensing unit, the optical sensor is able to detect the shape of the finger as an amount of finger curl, for example.

In the present embodiment, the sensor array 103A (and similarly the sensor arrays 103B and 103C described later) is worn on the hand by the grip member 101A at a more distal position than the carpal area (wrist). Consequently, even if the wrist is bent or twisted, the fingers are less likely to enter a blind spot in the detection range of the sensor array 103A. Thus, in the present embodiment, simple finger shape detection using the reflection of light is possible. Signal processing for such a detection technique has a low processing load compared to image recognition processing, for example. Consequently, power consumption and device cost may be kept low. Also, since the device does not cover the wrist and is contained in the palm area, there is a high degree of freedom in the motion of the user's hand, and the sense of burden from wearing the device is small.

Like in the illustrated example, by disposing the sensor array 103A on the palm side, or in other words on the side where the fingers curl, the shape of the fingers may be detected more reliably without generating occlusions. Note that the basic principle of finger shape detection by the optical sensor included in the sensor array 103A will be described later.

Additionally, the sensor array 103A does not necessarily need to include optical sensors corresponding to all of the fingers, and may also include one or more optical sensors corresponding to just one or some of the fingers. In the controller 100A according to the illustrated example, the sensor array 103A includes two optical sensors respectively corresponding to each of two fingers, namely the ring finger and the little finger.

The lamp 105 is an output device that provides visual feedback to the user by emitting light. As described later, the lamp 105 may also emit light as a result of a process based on the shape of the fingers detected by the sensor array 103A.

The stick 107, the wheel 109, the push button ill, the select lever 113, and the grip button 115 are examples of operable elements that detect operations performed by the user's hand or fingers. The controller 100A may transmit, in addition to a signal based on the shape of the fingers detected by the sensor array 103A, an operating signal detected by these operable elements to an external device described later.

The backpack 117 internally houses structural elements needed for driving the controller 100A or for communication, such as a battery and a communication device, for example. These structural elements are disposed distributed appropriately between the housing formed by the grip member 101A, and the backpack 117. Note that the backpack 117 may also be eliminated in some cases. In this case, the components that would have been housed, such as the structural elements needed for driving the controller 100A or for communication, and the speaker 119, may be housed inside the grip member 101A (this applies similarly to the controllers 100B and 100C described hereinafter).

The speaker 119 is an output device that provides auditory feedback to the user by outputting sound. As described later, the speaker 119 may also output sound as a result of a process based on the shape of the fingers detected by the sensor array 103A.

Note that in the present embodiment, besides the illustrated structural elements, the controller 100A includes an inertial measurement unit (IMU) and a vibrator as built-in structural elements.

Figure 2A:
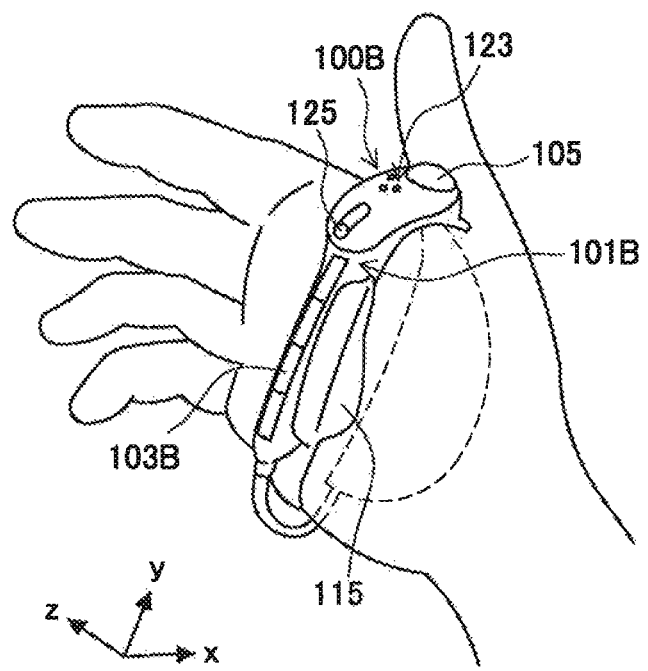
FIG. 2A is a diagram illustrating a second example of the controller according to the first embodiment of the present disclosure.
Figure 2B:
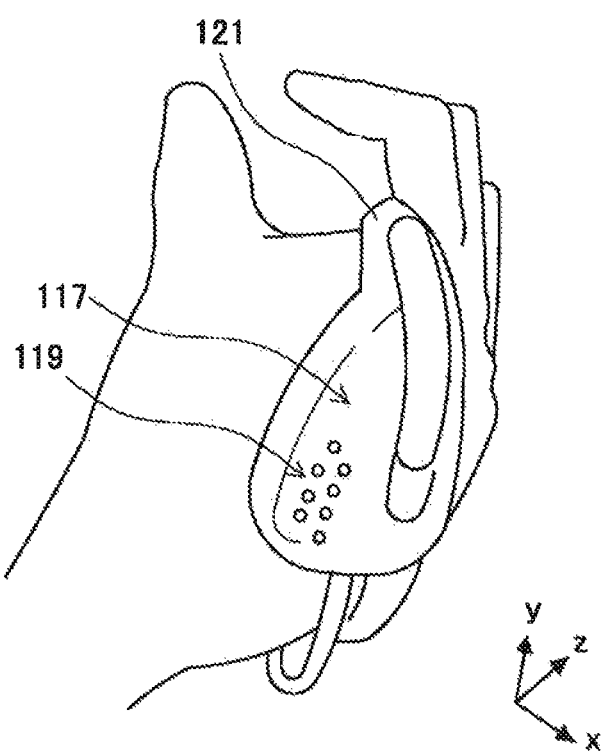
FIG. 2B is a diagram illustrating the second example of the controller according to the first embodiment of the present disclosure.

FIGS. 2A and 2B are diagrams illustrating a second example of a controller according to the first embodiment of the present disclosure. FIG. 2A is a view of the controller from the palm side, while FIG. 2B is a view of the controller from the back-of-the-hand side.

Referring to FIG. 2A, the controller 100B according to the second example is gripped in the user's right hand. On the palm side, the controller 100B includes a grip member 101B, a sensor array 103B, a lamp 105, a microphone 123, a flick lever 125, and a grip button 115. Referring to FIG. 2B, on the back-of-the-hand side, the controller 100B includes a backpack 117. On the backpack 117, a speaker 119 is provided. The grip member 101B and the backpack 117 are joined by a belt 121. The controller 100B is also an example of a detection device according to the present disclosure. Hereinafter, each of the structural elements will be described further. Note that structural elements which are the same as the controller 100A according to the first example will be denoted with common signs to reduce or omit further description.

The grip member 101B is gripped by the user's right hand. Similarly to the grip member 101A (for left hand) above, the grip member 101B forms a housing in which the sensor array 103B and the like are secured.

The sensor array 103B, similarly to the sensor array 103A above, includes optical sensors respectively corresponding to each of multiple fingers. The sensor array 103B, unlike the sensor array 103A, includes four optical sensors respectively corresponding to each of the four fingers from the index finger to the little finger. Note that the number of optical sensors is not limited to four. The sensor array 103B may also include less than four optical sensors, or include more than four optical sensors. In such cases, one optical sensor may be assigned to multiple fingers, or multiple optical sensors may be assigned to one finger.

The microphone 123 functions as a sound sensor that detects sound produced near the hand on which the controller 100B is worn. The flick lever 125 is an example of an operable element that detects an operation performed by the user's fingers. The controller 100B may transmit, in addition to a signal based on the shape of the fingers detected by the sensor array 103B, a signal based on sound detected by the microphone 123, an operating signal detected by the flick lever 125, and an IMU output signal from an IMU built into the controller 100B to an external device described later.

Note that in the present embodiment, besides the illustrated structural elements, the controller 100B also includes an IMU and a vibrator as built-in structural elements.

Figure 3A:
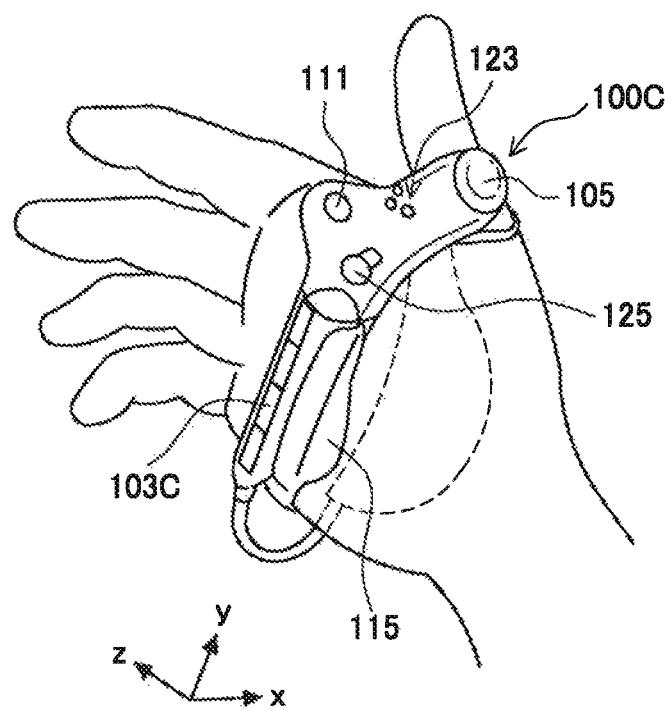
FIG. 3A is a diagram illustrating a third example of the controller according to the first embodiment of the present disclosure.
Figure 3B:
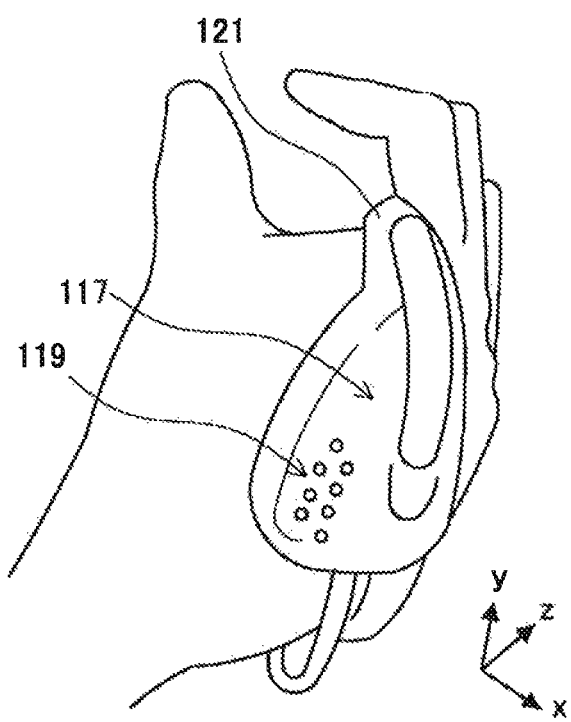
FIG. 3B is a diagram illustrating the third example of the controller according to the first embodiment of the present disclosure.

FIGS. 3A and 3B are diagrams illustrating a third example of a controller according to the first embodiment of the present disclosure. FIG. 3A is a view of the controller from the palm side, while FIG. 3B is a view of the controller from the back-of-the-hand side.

Referring to FIG. 3A, the controller 100C according to the third example is gripped in the user's right hand. On the palm side, the controller 100C includes a grip member 101B, a sensor array 103C, a lamp 105, a microphone 123, a flick lever 125, a push button 111, and a grip button 115. Referring to FIG. 3B, on the back-of-the-hand side, the controller 100C includes a backpack 117. On the backpack 117, a speaker 119 is provided. The grip member 101B and the backpack 117 are joined by a belt 121. The controller 100C is also an example of a detection device according to the present disclosure. Hereinafter, each of the structural elements will be described further. Note that structural elements which are the same as the controller 100A according to the first example and the controller 100B according to the second example will be denoted with common signs to reduce or omit further description.

The sensor array 103C, similarly to the sensor arrays 103A and 103B above, includes optical sensors respectively corresponding to each of multiple fingers. The sensor array 103C includes optical sensors respectively corresponding to each of the four fingers from the index finger to the little finger.

Note that in the present embodiment, besides the illustrated structural elements, the controller 100C also includes an IMU and a vibrator as built-in structural elements.

In the first to third examples described above, it is possible to use the controller 100A as a left-hand controller, in combination with the controller 100B or the controller 100C as a right-hand controller. For example, the user grips the controller 100A in the left hand, and grips the controller 100B in the right hand. Alternatively, the user may grip the controller 100A in the left hand, and grip the controller 100C in the right hand.

Additionally, in each of the above examples, whether the controllers 100A, 100B, and 100C are for the left hand or the right hand is not essential. In other words, the configuration of each of the controllers may also be realized inverted from left to right. As a result, for example, the user may also grip the controller 100B above and a left-to-right inverted controller 100B in the right and left hands, respectively. Similarly, the user may also grip the controller 100A and a left-to-right inverted controller 100A in the left and right hands, or the controller 100C and a left-to-right inverted controller 100C in the right and left hands, respectively.

Besides the examples described herein, each of the controllers 100 (including the controllers 100A, 100B, and 100C as well as their left-to-right inversions) may be combined freely. In cases in which the user grips controllers 100 in both the left hand and the right hand, output devices such as the lamp 105 and the speaker 119 may be provided in just either one of the controllers 100, for example. Alternatively, these may be provided in both of the controllers 100, and a stereo effect or the like may be realized by the speakers 119, for example. Additionally, it is not strictly necessary to grip controllers 100 in both the user's left hand and right hand, and a controller 100 may also be gripped in just one of either the left hand or the right hand.

Figure 4:
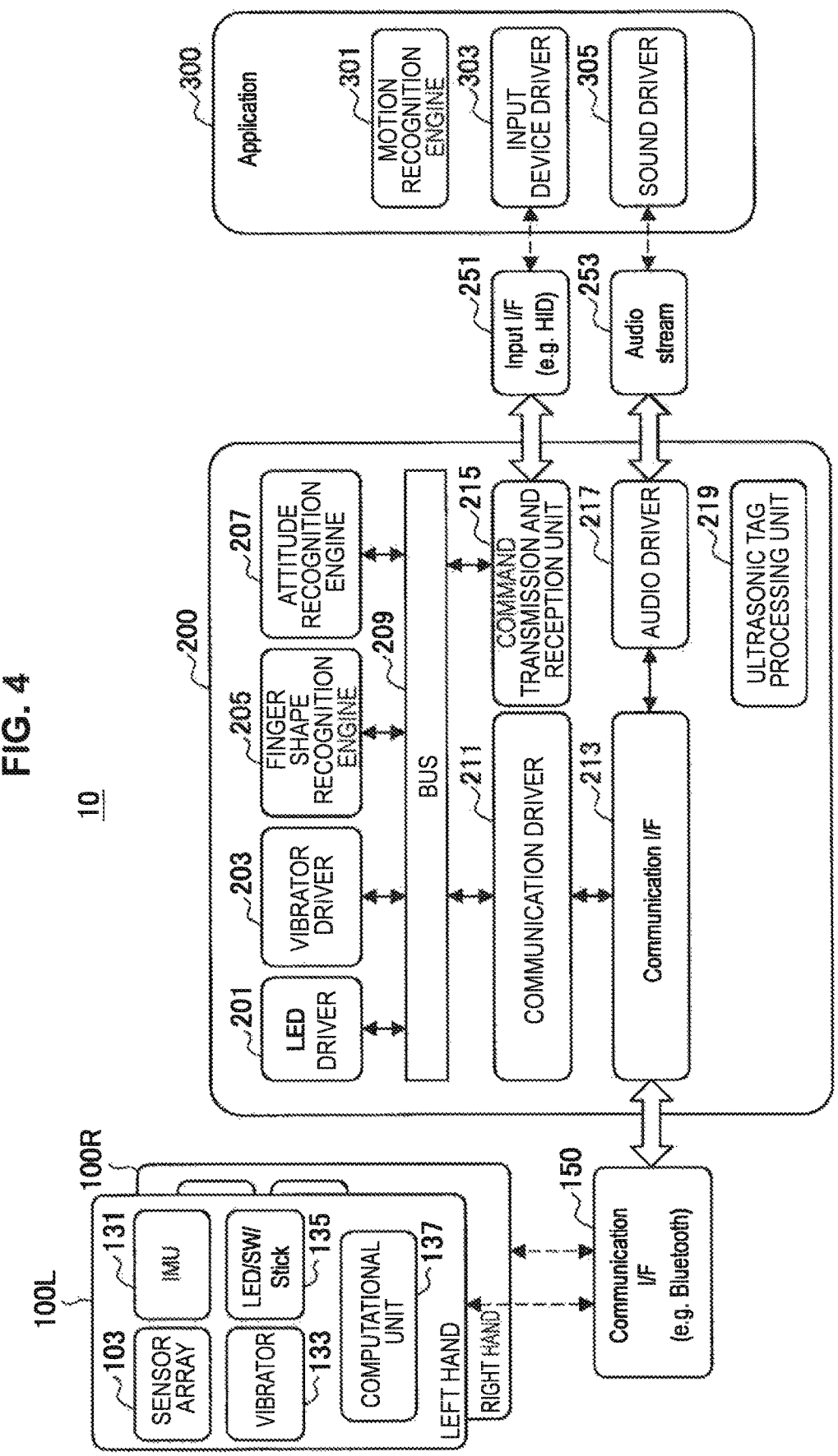
FIG. 4 is a diagram illustrating an example of a system according to the first embodiment of the present disclosure.

FIG. 4 is a diagram illustrating an example of a system according to the first embodiment of the present disclosure. Referring to FIG. 4, the system 10 according to the present embodiment includes a controller 100, a console device 200, and an application device 300.

The controller 100 includes a left-hand controller 100L and a right-hand controller 100R. Each of the left-hand controller 100L and the right-hand controller 100R may be any of the controllers 100A, 100B, and 100C described above, for example. Hereinafter, the structural elements included in common in these controllers 100 in the present embodiment will be described. In FIG. 4, a sensor array 103, an inertial measurement unit (IMU) 131, a vibrator 133, an other input/output device 135, and a computational unit 137 are illustrated as such structural elements.

The sensor array 103 may be the sensor array 103A, 103B, or 103C included in the controller 100A, 100B, or 100C described above, for example. The sensor array 103 includes optical sensors respectively corresponding to each of multiple fingers. Each optical sensor includes a light-emitting unit and a light-sensing unit, and measures the ratio of light emitted from the light-emitting unit that reflects off a target object and is incident on the light-sensing unit. In so doing, the shape of an individual finger may be detected as an amount of finger curl, for example. The sensor array 103 outputs a finger shape detection result to the computational unit 137.

The IMU 131 includes a three-axis acceleration sensor and a three-axis gyro sensor, for example. Additionally, the IMU 131 may also include a three-axis geomagnetic sensor. For example, the IMU 131 functions as an attitude sensor that detects the attitude of the hand gripping the controller 100, on the basis of a detection value of acceleration. The IMU 131 may also function as a motion sensor that detects the motion of the hand gripping the controller 100, on the basis of detection values of acceleration and angular velocity. The IMU 131 outputs a detection result of acceleration, angular velocity, and/or geomagnetism to the computational unit 137.

The vibrator 133 transmits vibration to the hand gripping the controller 100. The vibrator 133 operates in accordance with a control signal input from the computational unit 137. As described later, the vibrator 133 may also include a low-frequency vibrator and a high-frequency vibrator. In the present embodiment, the vibrator 133 is an example of an output unit that outputs a result of a process based on the shape of the fingers detected by the sensor array 103.

The other input/output device 135 includes components such as a lamp (a light-emitting diode (LED), for example), a switch (SW; including a push button or the like) and/or a stick. The configuration of the other input/output device 135 may be different between the left-hand controller 100L and the right-hand controller 100R.

In terms of the example of the controllers 100A, 100B, and 100C above, the other input/output device 135 includes the stick 107, the wheel 109, the push button 111, the select lever 113, the grip button 115, and the flick lever 125. These structural elements are examples of operable elements that detect an operation performed by the hand or fingers. Also, the other input/output device 135 includes a microphone 123. The microphone is an example of a sound sensor that detects sound produced near the hand. These input devices output a detection result for an operation performed by the hand or fingers, sound, or the like to the computational unit 137. Furthermore, the other input/output device 135 includes the lamp 105 and the speaker 119. The lamp 105 and the speaker 119 are examples of output units that output a result of a process based on the shape of the fingers or the like. These output devices operate in accordance with a control signal input from the computational unit 137.

The computational unit 137 is implemented by a processor such as a CPU built into the controller 100. As above, the computational unit 137 accepts the output of a finger shape detection result from the sensor array 103. Additionally, the computational unit 137 accepts the output of a detection result of acceleration, angular velocity, and/or geomagnetism from the IMU 131. Furthermore, the computational unit 137 accepts the output of a detection result of an operation, sound, or the like from a switch or stick, a microphone, or the like included in the other input/output device 135. The computational unit 137 preprocesses these detection results as necessary, and then transmits to the console device 200 via a communication interface 150.

Additionally, the computational unit 137 outputs a control signal to the vibrator 133 as well as to the lamp, speaker, and the like included in the other input/output device 135. In the present embodiment, the computational unit 137 generates a control signal on the basis of information received from the console device 200 via the communication interface 150.

The communication interface 150 may be wireless communication interface, such as Bluetooth (registered trademark) or Wi-Fi, for example. In another example, the communication interface 150 may also include infrared communication. Additionally, the communication interface 150 may also include a wired communication interface.

The console device 200 is a terminal device used together with the controller 100. The console device 200 may be a device such as a game terminal device, a mobile terminal device, a stationary home information terminal appliance device, a medical equipment device, or a broadcasting equipment device, for example. The console device 200 may be a dedicated terminal device with functions related to the controller 100, or also include other functions as well. In the illustrated example, the console device 200 includes an LED driver 201, a vibrator driver 203, a finger shape recognition engine 205, an attitude recognition engine 207, a bus 209, a communication driver 211, a communication interface 213, a command transmission and reception unit 215, an audio driver 217, and an ultrasonic tag processing unit 219.

The LED driver 201 is a driver of an LED lamp included in the other input/output device 135 of the controller 100. The LED driver 201 generates a control signal for the LED lamp in accordance with a command received from the command transmission and reception unit 215 via the bus 209. The control signal is transmitted to the controller 100 via the bus 209, the communication driver 211, and the communication interface 213.

The vibrator driver 203 is a driver of the vibrator 133 included in the controller 100. The vibrator driver 203 generates a control signal for the vibrator in accordance with a command received from the command transmission and reception unit 215 via the bus 209. The control signal is transmitted to the controller 100 via the bus 209, the communication driver 211, and the communication interface 213.

The finger shape recognition engine 205 recognizes the shape of the fingers on the basis of a finger shape detection result provided by the sensor array 103 included in the controller 100, or more specifically, an amount of finger curl. The detection result is provided from the controller 100 via the communication interface 213 and the communication driver 211. For example, the command transmission and reception unit 215 recognizes the shape of the fingers by comparing the provided detection result to predefined patterns. Furthermore, the finger shape recognition engine 205 issues a command corresponding to the recognized shape of the fingers. The issued command is transmitted to the application device 300 via the bus 209 and the command transmission and reception unit 215.

The attitude recognition engine 207 recognizes the attitude of the hand on the basis of a detection result from the acceleration, angular velocity, and/or geomagnetic sensor provided by the IMU 131 included in the controller 100. The detection result is provided from the controller 100 via the communication interface 213 and the communication driver 211. For example, the attitude recognition engine 207 recognizes the attitude of the hand on the basis of the direction of a gravity component included in the provided detection result. Furthermore, the attitude recognition engine 207 issues a command corresponding to the recognized attitude of the hand. The issued command is transmitted to the application device 300 via the bus 209 and the command transmission and reception unit 215.

Note that the console device 200, similarly to the finger shape recognition engine 205 that issues a command corresponding to the shape of the fingers, or the attitude recognition engine 207 that issues a command corresponding to the attitude of the hand, may also include a command issuing unit that issues a command corresponding to a motion of the hand, an operation performed by the hand or the fingers, and/or sound produced near the hand, or the like.

The bus 209 is an inter-process communication implementation for exchanging information between the drivers and engines inside the console device 200. The bus 209 is also called a D-Bus or a message bus, for example.

The communication driver 211 controls communication with the controller 100 via the communication interface 213. Consequently, in the present embodiment, the communication driver 211 is an example of an acquisition unit that acquires a signal indicating the shape of the fingers detected by a non-contact sensor unit worn on the hand. The communication driver 211 additionally may acquire a signal indicating vibration based on the attitude of the hand, the motion of the hand, an operation performed by the hand or the fingers, and/or sound produced near the hand, or the like. As above, communication between the console device 200 and the controller 100 is executed by wireless communication such as Bluetooth (registered trademark) or Wi-Fi, by infrared communication, or by a wired communication interface, for example. The communication driver 211 and the communication interface 213 are designed to be adapted to these communication methods.

The command transmission and reception unit 215 transmits commands issued by the finger shape recognition engine 205 and the attitude recognition engine 207 above, for example, to the application device 300 via an input interface 251. Additionally, the command transmission and reception unit 215 may also acquire an operation command provided by an operable element such as a switch or a stick included in the other input/output device 135 of the controller 100 via the communication interface 213, the communication driver 211, and the bus 209, and transmit the acquired operation command to the application device 300. The application device 300 is a different device from the detection device equipped with the non-contact sensor unit (for example, the controller 100). Also, the command transmission and reception unit 215 receives commands for the LED driver 201 and the vibrator driver 203 above, for example, from the application device 300 via the input interface 251. The input interface 251 may include a virtualized human interface device (HID), for example.

The audio driver 217 exchanges sound data with the application device 300 via an audio stream 253. More specifically, the audio driver 217 acquires sound data acquired by a microphone or the like included in the other input/output device 135 of the controller 100 via the communication interface 213, and transmits the acquired sound data to the application device 300. Also, on the basis of sound data received from the application device 300, the audio driver 217 transmits sound data for output from a speaker included in the other input/output device 135 of the controller 100 via the communication interface 213.

As described later, the ultrasonic tag processing unit 219 executes a process related to an ultrasonic tag included in the controller 100 in several embodiments.

The application device 300 is a device that provides an application utilizing the controller 100. The application device 300 may also be a terminal device similar to the console device 200, for example. In this case, the application device 300 may also be the same device as the console device 200. Additionally, the application device 300 may also be a wearable device. Alternatively, the application device 300 may also be a server device that communicates with the console device 200 over a network. The application device 300 includes a motion recognition engine 301, an input device driver 303, and a sound driver 305.

For example, in cases such as when the console device 200 and the application device 300 are the same device, this device may be equipped with a command issuing unit that issues a command corresponding to the shape of the fingers, the attitude of the hand, the motion of the hand, an operation performed by the hand or the fingers, and/or sound produced near the hand (for example, a structural element unifying the finger shape recognition engine 205, the attitude recognition engine 207, the motion recognition engine 301, and the input device driver 303 above), and a transmission unit that transmits such a command to a detection device (for example, the controller 100) equipped with a non-contact sensor unit (for example, a structural element unifying the communication driver 211 and the command transmission and reception unit 215).

The motion recognition engine 301 recognizes the motion of the hand, on the basis of a detection result of acceleration, angular velocity, and/or geomagnetism provided by the IMU 131 included in the controller 100, and additionally, output results from the finger shape recognition engine 205 and the attitude recognition engine 207. The detection result is provided from the controller 100 via the console device 200. The motion recognition engine 301 issues a command corresponding to the recognized motion of the hand to the input device driver 303 and/or the sound driver 305. Note that in the illustrated example, the motion recognition engine 301 is implemented in the application device 300, but in another example, a motion recognition engine may also be implemented in the console device 200.

The input device driver 303 executes control of a device recognized as an input device in an application provided in the application device 300. For example, the input device driver 303 receives commands issued by the finger shape recognition engine 205 and the attitude recognition engine 207 of the console device 200, or an operating command provided by an operable element such as a switch or a stick included in the other input/output device 135 of the controller 100, and on the basis of these commands, executes a process related to an application. As a result of executing the process, the input device driver 303 issues commands for the LED driver 201 and the vibrator driver 203 of the console device 200. These commands are transmitted to the console device 200 via the input interface 251.

The sound driver 305 executes sound-related control in an application provided in the application device 300. For example, the sound driver 305 follows command issued by the motion recognition engine 301 and the input device driver 303 to transmit sound data to the console device 200 via the audio stream 253.

In the system 10 as described above, for application operations that the user performs by using his or her hands and fingers, operations may be recognized on the basis of the shape of the fingers and the attitude or the motion of the hand. For example, combinations of the shape of the fingers and the attitude of the hand may be recognized as various hand signs. Further, for example, combinations of the shape of the fingers and the motion of the hand may be recognized as various actions using the hand and fingers, such as opening, grasping, turning, and throwing. Consequently, in the present embodiment, recognition accuracy is greatly improved compared to the case of recognizing operations in accordance with only the motion of the hand, for example.

Figure 5:
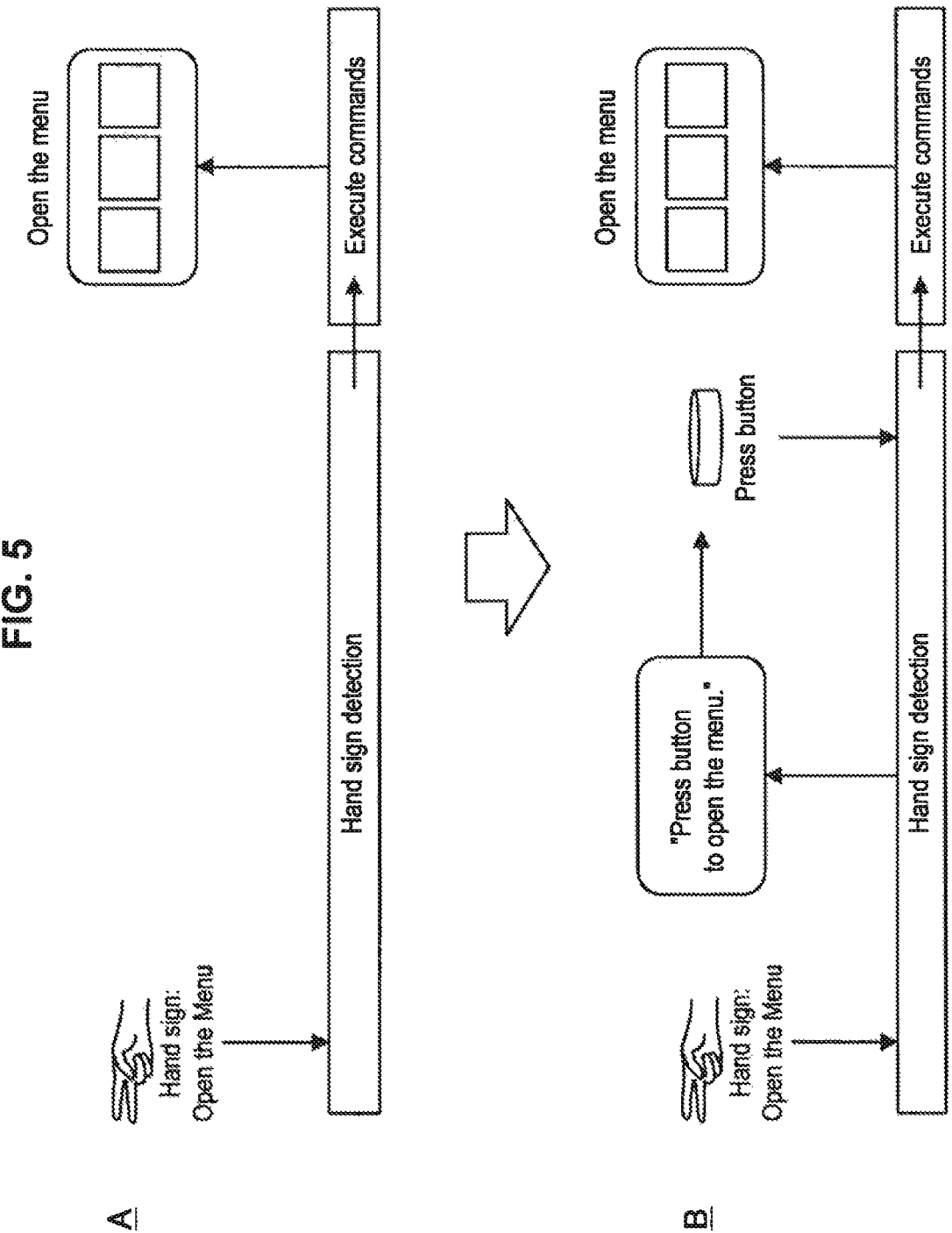
FIG. 5 is a diagram for explaining an example of hand sign recognition according to the first embodiment of the present disclosure.

FIG. 5 is a diagram for explaining an example of hand sign recognition according to the first embodiment of the present disclosure. In the illustrated example, a hand sign indicating an instruction to open a menu is recognized. In the example labeled A, a command of opening the menu is issued by recognizing the hand sign alone. Meanwhile, in the example labeled B, the push button 111 is provided in the controller 100, and thus in addition to recognizing the hand sign, a message stating "Press button to open the menu" is output by speech or the like, and if the button is pressed, a command of opening the menu may be issued.

In the present embodiment, since the recognition accuracy of finger shape is improved by providing the sensor array 103 in the controller 100, recognition with high accuracy to some degree is possible, even when recognizing the hand sign alone, like in the example of A, for example. Furthermore, if recognition combining the recognition of a hand sign followed by an operation on an operable element such as the push button 111 is conducted, like in the example of B, even if the shape of the fingers and the attitude of the hand accidently resemble the hand sign, it is possible to prevent the command of opening the menu from being issued against the user's will. Additionally, improvements are also possible with respect to the time taken to input a gesture, and the inability to input the same command consecutively.

Figure 6:
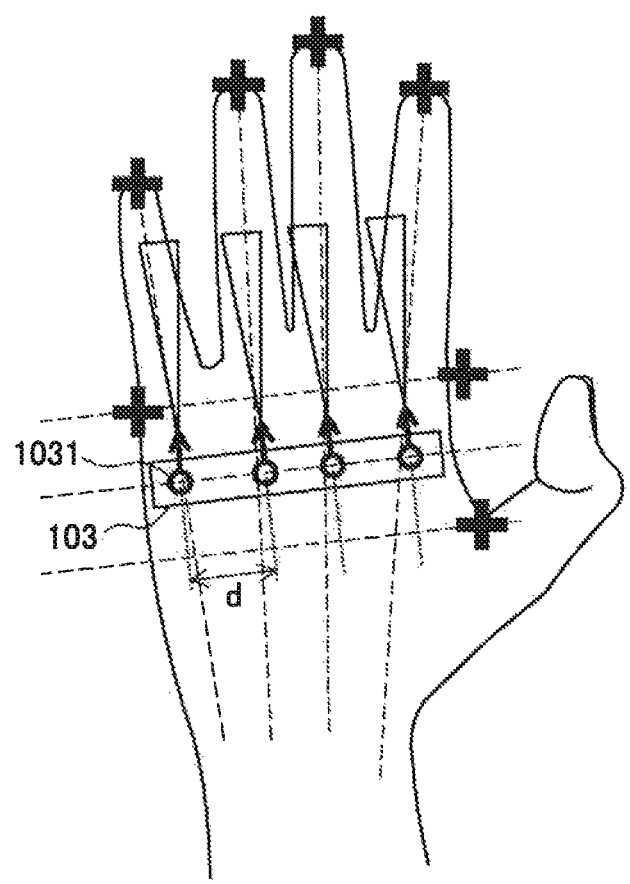
FIG. 6 is a diagram for explaining a method of detecting the shape of the fingers according to the first embodiment of the present disclosure.

FIG. 6 is a diagram for explaining a method of detecting the shape of the fingers according to the first embodiment of the present disclosure. As above, in the present embodiment, the sensor array 103 provided in the controller 100 detects the shape of the fingers by using optical sensors. FIG. 6 illustrates an extraction of just the sensor array 103 and the hand for the sake of explanation. In the illustrated example, the sensor array 103 includes four optical sensors 1031. The optical sensors 1031 respectively correspond to each of the four fingers from the index finger to the little finger. Each of the optical sensors 1031 includes a light-emitting unit that emits light of a certain wavelength and a light-sensing unit that senses light reflecting off a finger.

Herein, in the illustrated example, the optical axis of the light-emitting unit and the light-sensing unit is set to pass through the position of each finger when curled. In this case, if the user intentionally opens his or her hand and extends a finger, the light emitted from the light-emitting unit advances in a straight line without reflecting off the finger, and light-sensing unit does not sense reflected light. Conversely, if the user curls a finger, as the amount of curl increases, the light emitted from the light-emitting unit reflects off the finger at a closer position, and thus the light-sensing unit senses stronger reflected light. Consequently, the amount of finger curl may be detected on the basis of the strength of the reflected light sensed by the light-sensing unit.

The positions of the sensor array 103 and the optical sensors 1031 are optimized to enable detection as above. For example, each of the optical sensors 1031 is disposed so that the distance between the sensor and the first joint of the finger becomes a certain value in a state in which the user relaxes his or her hand and curls the finger naturally. The arrangement of the optical sensors 1031 may be adjusted in accordance with factors such as the attachment position and angle of the sensor array 103 in the controller 100, the spacing d between the optical sensors 1031 within the sensor array 103, and the attachment angles of the light-sensing unit and the light-emitting unit of the individual optical sensors 1031.

For the optical sensors 1031 constituting the sensor array 103 as above, vertical-cavity surface-emitting laser (VCSEL) sensors may be used, for example. Note that the sensor array 103 may be made up of optical sensors other than VCSEL sensors, but is also not limited to optical sensors, and may also be made up of any of various types of non-contact sensors. For example, it is possible to configure the sensor array 103 using electrostatic sensors, heat sensors, sonic (ultrasonic) sensors, visible-light sensors (cameras), radio wave sensors, or the like.

In the present embodiment, by disposing a non-contact sensor including the sensor array 103 as above on the palm side of the hand, the shape of the fingers may be detected more reliably without generating occlusions during the detection by the sensors for detecting finger shape. Note that although occlusion is primarily an optics-related term, the case of a non-contact sensor other than an optical sensor is also similar. In other words, insofar as the sensor is a non-contact sensor, a lack of obstructions between the target object (a finger) and the sensor will still improve the accuracy of detection. In the case of a non-contact sensor, it is not necessary to wear a device on the fingertips to detect the shape of the fingers, thereby enabling the user to perform other actions, such as device operations using buttons or a touch panel, for example, in parallel with the detection of the shape of the fingers.

Additionally, by disposing the sensor array 103 in the controller 100, the console device 200 and the user may also be distanced from each other, for example. In this point, the present embodiment is advantageous compared to cases such as recognizing gestures using a camera or the like affixed to the console device, for example.

Figure 7:
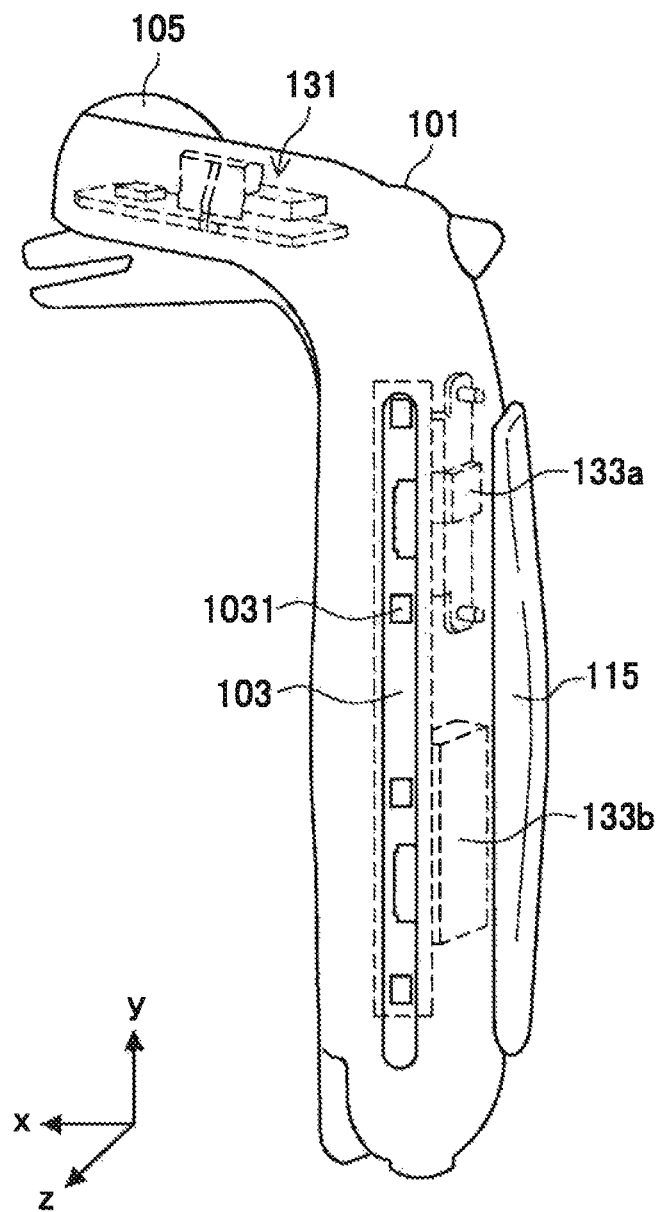
FIG. 7 is a diagram for explaining an internal structure of a controller according to the first embodiment of the present disclosure.

FIG. 7 is a diagram for explaining an internal structure of the controller according to the first embodiment of the present disclosure. FIG. 7 illustrates the internal structure of the grip member 101 of the controller 100. Given that the sensor array 103B includes four optical sensors, the illustrated controller 100 corresponds to the controller 100B according to the second example described with reference to FIGS. 2A and 2B above, but the internal configuration is still similar for the controller 100 according to another example.

As illustrated, in the controller 100 according to the present embodiment, a housing formed by the grip member 101 houses an IMU 131, and vibrators 133a and 133b. Note that for the sake of reference, the sensor array 103, the lamp 105, and the grip button 115 disposed on the surface of the grip member 101, as well as the optical sensors 1031 included in the sensor array 103, are also illustrated. Of these, the vibrators 133a and 133b will be described further below.

The vibrator 133a includes an eccentric motor, for example, and produces low-frequency vibration. The vibrator 133a is affixed to the grip member 101 at a position closer to the index finger (in the illustration, a position having a larger y-axis coordinate), and transmits low-frequency vibration to the hand.

The vibrator 133b includes a linear motor, for example, and produces high-frequency vibration. The vibrator 133b is affixed to the grip member 101 at a position closer to the little finger (in the illustration, a position having a smaller y-axis coordinate), and transmits high-frequency vibration to the hand.

According to the arrangement of the vibrators 133a and 133b as above, low-frequency vibration and high-frequency vibration are transmitted to a position close to the index finger of the hand and a position close to the little finger, respectively. By transmitting vibration to the hand at different positions separated from each other in this way, it is possible to express fine nuances of vibration compared to using a single vibrator, for example. The positioning of the low-frequency vibrator (vibrator 133a) at a position near the index finger and the high-frequency vibrator (vibrator 133b) at a position near the little finger is a reflection of the structure and the sensing characteristics of the hand. In another example, vibrators 133 that produce vibrations of mutually different frequencies may be provided in a different arrangement from the above, in accordance with factors such as the characteristics of the transmitted vibrations. Also, in another embodiment, a single vibrator 133 may be provided.

Note that the terms low-frequency vibration and high-frequency vibration in the above description of the vibrators 133a and 133b indicate that the frequencies of the vibrations respectively produced by the vibrator 133a and the vibrator 133b are different, but are not intended to limit the respective frequencies of the vibrations to specific frequencies.

Figure 8:
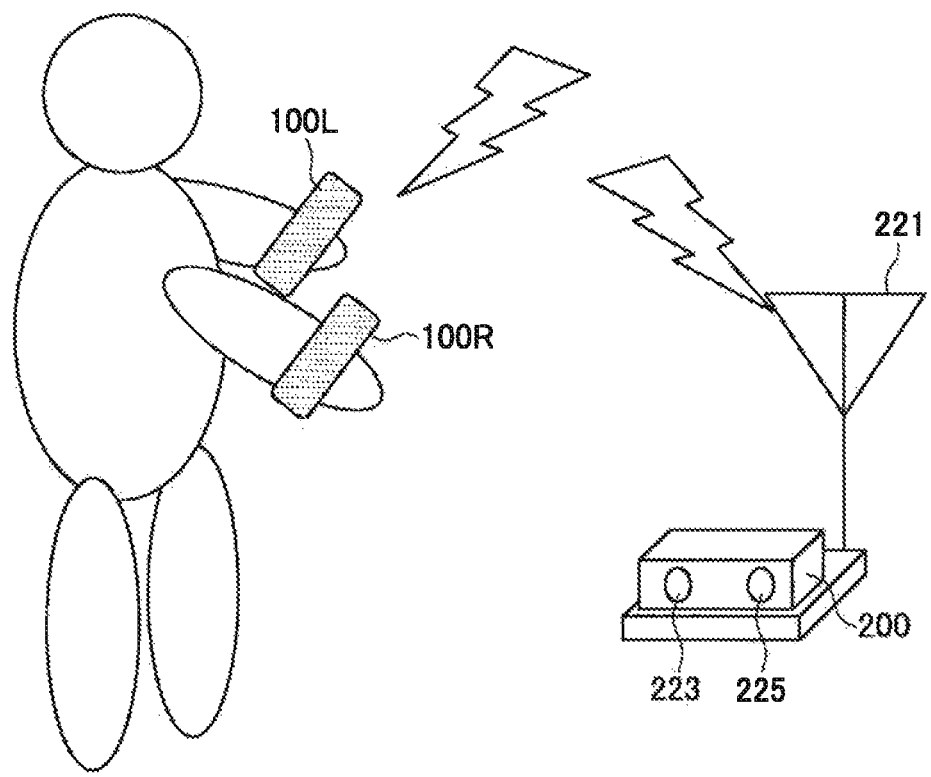
FIG. 8 is a diagram for explaining an example of authentication utilizing a controller according to the first embodiment of the present disclosure.

FIG. 8 is a diagram for explaining an example of authentication utilizing the controller according to the first embodiment of the present disclosure. Referring to FIG. 8, a user wears the controllers 100L and 100R on his or her left and right hands, respectively, and approaches the console device 200. At this point, either of the controllers 100L and 100R receives a weak wireless beacon signal transmitted periodically from an antenna 221 by the console device 200. After receiving the beacon signal, the controllers 100L and 100R activate from a standby state, and transmit a signal notifying the console device 200 that the controllers 100L and 100R are nearby. In the illustrated example, each of the controllers 100L and 100R includes a function of receiving a beacon signal, and thus the probability of successfully receiving a beacon signal rises as a result.

After the pairing of communication between the controllers 100L and 100R and the console device 200 is completed, as an indication that pairing is complete, the controllers 100L and 100R cause the lamp 105 to light up with a certain color (blue, for example), and also cause a sound such as "HELLO" to be output from the speaker 119.

Meanwhile, in the illustrated example, the console device 200 is equipped with a stereo depth camera 223 and a beamforming microphone 225, and detects the light-up of the lamp 105 and the sound output from the speaker 119 in the controllers 100L and 100R. Consequently, the console device 200 specifies the direction in which the user is present, and the approximate position of the user. Furthermore, the console device 200 uses the camera to capture an image in the specified position and direction, and verifies a face image of the user included in the acquired image against preregistered face images. After the face image verification is completed, the console device 200 treats the user as authenticated, and allows login to the console device 200. Alternatively, the user may speak a specific phrase such as "Login" to the console device 200, thereby causing the console device 200 to execute speaker recognition on the spoken speech, and if the speaker matches a registered user, the console device 200 may allow login to the console device 200.

2. Second Embodiment

Figure 9:
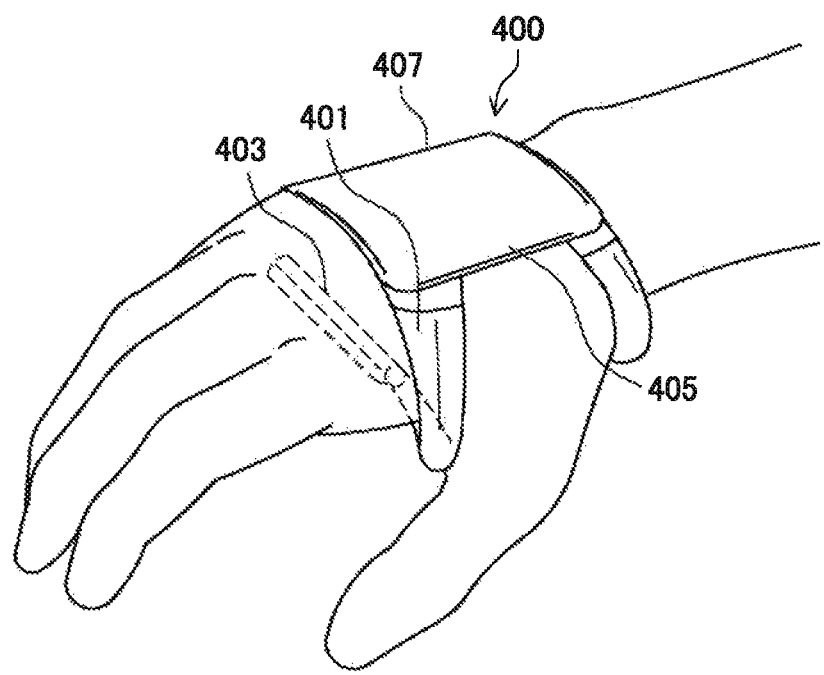
FIG. 9 is a diagram illustrating an example of a wearable terminal according to a second embodiment of the present disclosure.

FIG. 9 is a diagram illustrating an example of a wearable terminal according to a second embodiment of the present disclosure. Referring to FIG. 9, a wearable terminal 400 according to the present embodiment includes a frame 401, a sensor array 403, a housing 405, and a display 407. The wearable terminal 400 is an example of a detection device according to the present disclosure. Hereinafter, each of the structural elements will be described further.

The frame 401 has a shape that wraps around the palm of the hand and/or the wrist area, to affix the housing 405 to the back of the hand. In the illustrated example, the frame 401 is joined to the housing 405 on the back-of-the-hand side, and also wraps around to the palm side to be joined to the sensor array 403 on the palm side. With such a structure, the positional relationship between the sensor array 403 and the hand is fixed. Consequently, the frame 401 is an example of a mounting unit according to the present disclosure.

The sensor array 403, similarly to the sensor array 103 of the controller 100 in the first embodiment above, includes multiple optical sensors, for example, and detects the shape of the fingers. Note that, similarly to the sensor array 103, the sensor array 403 may also be substituted with another non-contact sensor.

The housing 405 is disposed on the back of the hand, and is affixed to the hand by the frame 401. The display 407 is disposed on the surface of the housing 405, and presents various information to the user as images. Also, although not illustrated, the housing 405 may house an IMU, a vibrator, an other input/output device, and a computational unit, similarly to the controller 100 according to the first embodiment above.

The wearable terminal 400 provides various information in accordance with user operations. The information may be presented as images by the display 407, or may be output as sound by a speaker (not illustrated). Herein, the shape of the fingers detected by the sensor array 403 may be utilized for operations on the wearable terminal 400 including the display 407. Consequently, in the present embodiment, the display 407 is an example of an output unit that outputs a result of a process based on the shape of the fingers. In addition, it may also be possible to utilize the attitude of the hand and/or the motion of the hand detected by the IMU for operations on the wearable terminal 400.

In the above example, the wearable terminal 400 may be considered to be a detection device and a control device equipped with a non-contact sensor unit that detects the shape of the fingers, a mounting unit that mounts the non-contact sensor on the hand, an acquisition unit that acquires a signal indicating the shape of the fingers detected by the non-contact sensor unit, a command issuing unit that issues a command corresponding to the shape of the fingers, and an output unit like the display 407. Herein, the acquisition unit internally acquires a signal indicating the shape of the fingers, and the command issuing unit issues a control command for the output unit.

In the above example, by using the hand on the side on which the wearable terminal 400 is worn, and by changing the shape of the fingers and the attitude of the hand, or moving the hand, operating input may be given to the wearable terminal 400. Such operating input may be simple compared to operating input using a touch panel provided on the display 407, or another operable element, for example. This is because in many cases, operating input using an operable element must be executed using the hand on the opposite side from the side on which the wearable terminal 400 is worn. Operating input using the shape of the fingers and the attitude or the motion of the hand is executable even in cases in which the opposite hand is occupied (for example, holding a hand strap on a train, or holding a bag). Obviously, even for the wearable terminal 400, operating input using an operable element such as a touch panel may also be possible for cases in which the opposite hand is free.

3. Example of Functional Configuration

Figure 10:
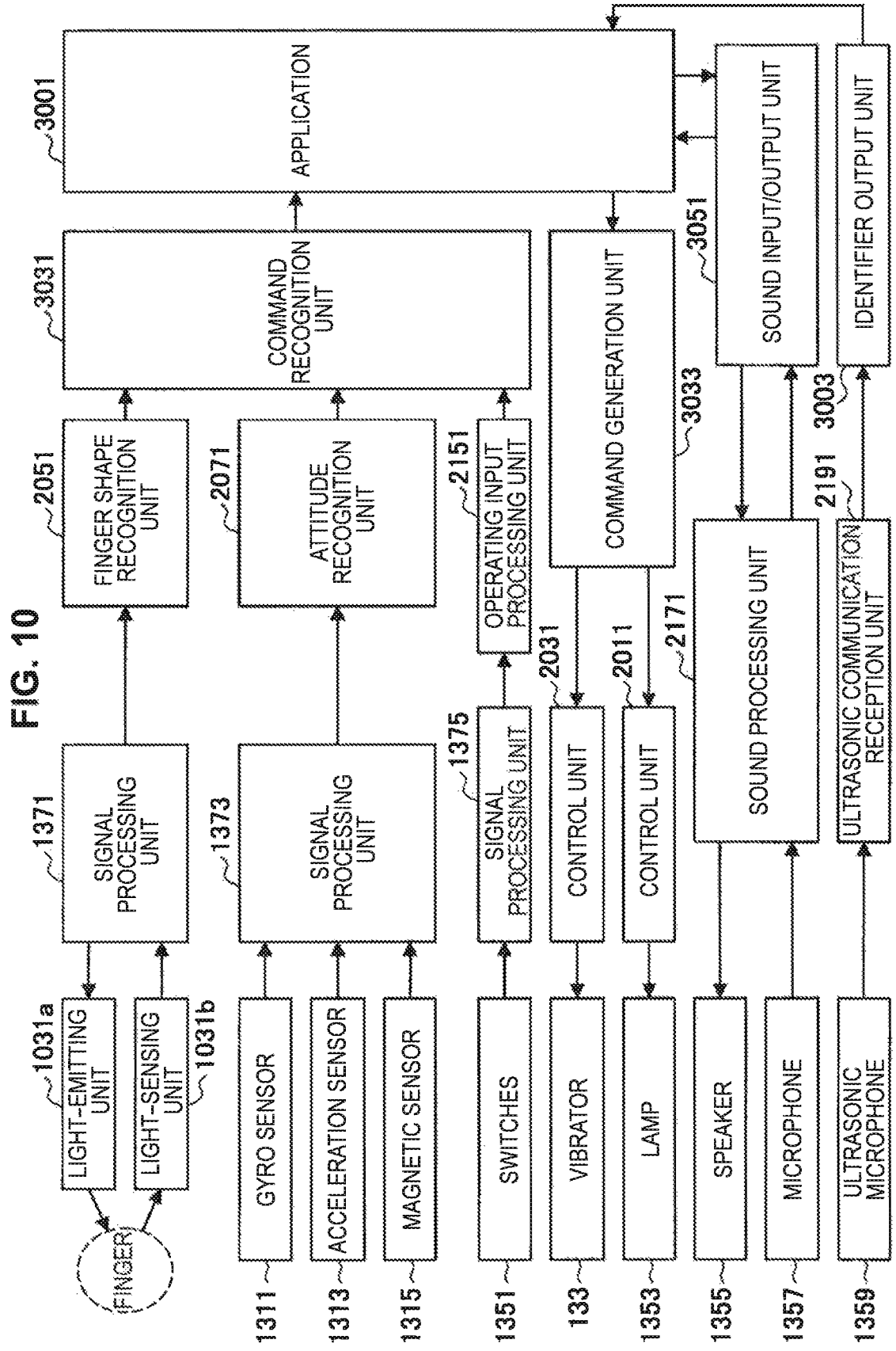
FIG. 10 is a block diagram illustrating an example of a functional configuration according to several embodiments of the present disclosure.

FIG. 10 is a block diagram illustrating an example of a functional configuration according to several embodiments of the present disclosure. For example, in the first and second embodiments described above, the functional configuration of a system according to the embodiments is described by the block diagram in FIG. 10. Note that although respective functional elements are denoted with signs related to the signs of the structural elements in the system described in the first embodiment, this simply indicates that the respective functional elements may correspond to these structural elements in the first embodiment, and does not necessarily limit the structural elements that realize the functional elements. Also, although the signs of the structural elements that realize the functions reference those of the first embodiment, the functions may be realized by similar structural elements even in the second embodiment. Hereinafter, each of the functional elements will be described further.

The light-emitting unit 1031a and the light-sensing unit 1031b constitute the optical sensor 1031 included in the sensor array 103 of the controller 100. Light of a certain wavelength emitted from the light-emitting unit 1031a reflects off a finger and is incident on the light-sensing unit 1031b. The light-emitting unit 1031a emits light in accordance with a control signal output by a signal processing unit 1371. In addition, the light-sensing unit 1031b converts the incident light into a signal, and inputs into the signal processing unit 1371. The signal processing unit 1371, by comparing the strength of the light indicated by the control signal for the light-emitting unit 1031a and the strength of the light expressed by the signal from the light-sensing unit 1031b, is able to calculate the ratio of light reflecting off the finger. From this ratio, the amount of finger curl may be detected, according to the basic principles as described with reference to FIG. 6 earlier. The signal processing unit 1371 is realized by the computational unit 137 in the controller 100, for example.

Information indicating a detected amount of finger curl in the signal processing unit 1371 is transmitted to a finger shape recognition unit 2051. The finger shape recognition unit 2051 recognizes the shape of the fingers by comparing the pattern of the detected amount of finger curl to predefined patterns. The patterns may be predefined in correspondence with commonly used hand signs, for example. The finger shape recognition unit 2051 is realized by the finger shape recognition engine 205 in the console device 200, for example.

A gyro sensor 1311, an acceleration sensor 1313, and a magnetic sensor 1315 are included in the IMU 131 of the controller 100, for example. A signal indicating the angular velocity, acceleration, and geomagnetism detected by these sensors is input into a signal processing unit 1373. The signal processing unit 1373 preprocesses the signal as necessary, and then transmits to an attitude recognition unit 2071. The attitude recognition unit 2071 recognizes the attitude of the hand on the basis of the detection result of acceleration, for example. The detection results of angular velocity and geomagnetism are forwarded to a command recognition unit 3031 downstream. The signal processing unit 1373 is realized by the computational unit 137 in the controller 100, for example. Also, the attitude recognition unit 2071 is realized by the attitude recognition engine 207 in the console device 200, for example.

The switches 1351 correspond to the other input/output device 135 of the controller 100 according to the first embodiment, for example, and more specifically, to the stick 107, the wheel 109, the push button 111, the select lever 113, the grip button 115, and/or the flick lever 125. An operating signal output due to the switches 1351 being operated is preprocessed as necessary in a signal processing unit 1375, and then transmitted to an operating input processing unit 2151. The signal processing unit 1375 is realized by the computational unit 137 in the controller 100, for example. Also, the operating input processing unit 2151 is realized by the command transmission and reception unit 215 in the console device 200, for example.

The command recognition unit 3031 recognizes a command for an application, on the basis of the shape of the fingers recognized by the finger shape recognition unit 2051, the attitude of the hand recognized by the attitude recognition unit 2071, and operating input using the switches 1351 (operable elements) acquired by the operating input processing unit 2151. Commands recognized by the command recognition unit 3031 may resemble commands recognized on the basis of gesture recognition using an image captured by a camera, for example. However, in the illustrated example, commands are recognized on the basis of operating input using operable elements in addition to the shape of the fingers and the attitude of the hand. Also, in the illustrated example, the recognition accuracy for the shape of the fingers and the attitude of the hand is greatly improved compared to the case of using an image, for example. The command recognition unit 3031 is realized by the input device driver 303 in the application device 300, for example. A command recognized by the command recognition unit 3031 becomes an input command for an application 3001.

A command generation unit 3033 generates an output command in accordance with the operation of the application 3001. The command generation unit 3033 is realized by the input device driver 303 in the application device 300, for example. The generated output command is transmitted to control units 2011 and 2031. The control unit 2011 controls a lamp 1353. The lamp 1353 corresponds to the other input/output device 135 of the controller 100, and more specifically the lamp 105, for example. The control unit 2031 controls the vibrator 133. The control unit 2011 and the control unit 2031 are realized respectively by the LED driver 201 and the vibrator driver 203 in the console device 200, for example.

Meanwhile, the input and output of sound related to the application 3001 is executed by a sound input/output unit 3051. The sound input/output unit 3051 is realized by the sound driver 305 in the application device 300, for example. The sound input/output unit 3051 generates output sound in accordance with the operation of the application 3001. The output sound is transmitted to a sound processing unit 2171, and then output from a speaker 1355. The sound processing unit 2171 is realized by the audio driver 217 of the console device 200, for example. The speaker 1355 corresponds to the other input/output device 135 of the controller 100, and more specifically the speaker 119, for example. Meanwhile, input sound with respect to the application 3001 is acquired by a microphone 1357, passed through the sound processing unit 2171, and transmitted to the sound input/output unit 3051. The microphone 1357 corresponds to the other input/output device 135 of the controller 100, and more specifically the microphone 123, for example.

Furthermore, in the illustrated example, a process utilizing an ultrasonic tag in relation to the application 3001 is possible. An ultrasonic microphone 1359 is included in the other input/output device 135 of the controller 100, for example. The ultrasonic microphone 1359 detects and converts ultrasonic waves into a signal, and transmits to an identifier output unit 3003 via an ultrasonic communication reception unit 2191. The identifier output unit 3003 extracts, from the signal received by ultrasonic waves, an identifier of another controller 100, for example, and inputs into the application 3001.

Note that, as described in accordance with the first embodiment, for example, the respective functional elements described above may also be realized distributed among the controller 100, the console device 200, and the application device 300. Also, like in the second embodiment, for example, the functions from input and output to the operation of the application may also be completed by a single device (the wearable terminal 400). In this case, all of the above functional elements are realized by the single device. In this way, in an embodiment of the present disclosure, the way in which the functional elements are realized by a device or devices may be decided arbitrarily.

4. Other Embodiments

Hereinafter, several other embodiments of the present disclosure and their effects will be described further. Note that in the following description, the configurations and/or the effects of the first and second embodiments described above are also included.

In the finger gesture recognition function according to several embodiments of the present disclosure, since gestures may be recognized in the hand, the problem of occlusions during camera sensing does not occur, unlike a gesture recognition system using camera sensing information from afar, for example. Consequently, even if the user executes a gesture of the fingers while his or her back is turned toward the console device, or the user executes a gesture of the fingers under a desk or the like where the gesture is hidden from the view of the console device, for example, the gesture may still be detected with high accuracy. As a result, constraints related to location and attitude when the user executes gestures may be reduced.

Additionally, in the finger gesture recognition function according to several embodiments of the present disclosure, an optical sensor (for example, a photodiode) is disposed on the palm side to detect an amount of finger curl. Consequently, even in situations such as executing gestures outdoors, for example, natural light noise such as sunlight is blocked by the back of the hand or the like, enabling gesture recognition with high accuracy.

Additionally, in the finger gesture recognition function according to several embodiments of the present disclosure, gestures may be recognized on the basis of information about the shape of the fingers, information about the attitude of the hand, and information about motion past the wrist, including the back of the hand. Consequently, it is also possible to distinguish between a gesture in which the hand is open and still, and a gesture in which the hand is open and waving, for example. As a result, it becomes possible to recognize more types of gestures.

Additionally, in the finger gesture recognition function according to several embodiments of the present disclosure, it is possible to present a recognized gesture to the user via a display or the like, and enable a final input to be executed with an operable element such as a button. As a result, more reliable gesture-based command input is realized.

Additionally, in the finger gesture recognition function according to several embodiments of the present disclosure, it is possible to present a recognized gesture to the user by tactile feedback from an output device such as a vibrator built into the gesture detection device, visual feedback from an LED lamp or the like provided on the gesture detection device, and/or auditory feedback from a speaker or the like provided on the gesture detection device, and enable a final input to be executed by an operable element such as a button. As a result, more reliable gesture-based command input is realized.

Additionally, a controller according to several embodiments of the present disclosure may be used as a game controller, for example, thereby enabling the easy execution of action operations in a game having a three-dimensional virtual space, such as operations of readying a weapon, attacking an enemy, opening and closing an object such as a door or a box, and picking up, throwing, grabbing, or turning an object. For example, in the case of attempting to execute such operations with combinations of operations on operable elements such as buttons, the user is required to memorize features such as the types, positions, and combinations of the operable elements.

Additionally, a controller according to several embodiments of the present disclosure is gripped in each of the user's left hand and right hand, and a vibrator is built into each. For example, by producing vibration with a time lag in the left and right controllers, it is possible to present a directional sensation going from left to right, or from right to left. Furthermore, by synchronizing feedback using light, sound, and the like output from the controllers with the vibrational feedback (cross-modal feedback), it is also possible to present a directional sensation that is stronger than the case of vibration alone.

Additionally, each vibrator may include a low-frequency vibrator realized by an eccentric motor or the like that produces low-frequency vibration, and a high-frequency vibrator realized by a linear motor or the like that produces high-frequency vibration. As a result, vibrations extending over a frequency band from several tens of hertz to several hundred hertz may be produced, for example, and in addition, vibrations may be transmitted to the palm and the fingertips, which is an area that is anatomically sensitive to tactile stimulation. Consequently, expressive tactile stimulation is realized.

Additionally, a controller according to several embodiments of the present disclosure includes a function of outputting tactile sensation with the vibrator, in addition to finger shape recognition. Thus, in a surgical simulation system in the medical field, for example, when conducting a simulation in which a surgeon holds a scalpel and makes an incision in an affected area, usage is possible as a hand-worn surgical simulation controller with a vibrational feedback function capable of outputting vibration when making an incision as feedback.

By applying feedback such as the feedback of tactile stimulation of the left and right hands or the feedback by synchronized stimulation of vibration and sound, vibration and light, or the like as above to a game controller device, information such as the state of a character in a game may be transmitted to the user more vividly, for example.

Also, in the applied example of a game controller device, with an integrated operation function of a horizontal wheel-type switch and a stick, it is possible to operate the stick and the horizontal wheel with the fingers of one hand to execute operating input for moving and looking around at the same time. As a result, the user is able to easily input operations for looking around while also moving within a game having a three-dimensional virtual space.

Additionally, in a controller according to several embodiments of the present disclosure, various types of switches are assigned to each of the fingers, such as a stick for the thumb, a horizontal wheel for the index finger, a select lever for the middle finger, and a grip for the ring finger and the little finger. In this case, fingering is unnecessary when operating the switches, and the user is able to execute desired operations easily without looking at his or her hands.

Additionally, in a controller according to several embodiments of the present disclosure, since operations are possible by finger gestures, without needing to look at one's hands when operating switches as above, it is possible to execute operating input while looking at the display or the like of another device, for example. Accordingly, for example, the controller may be used effectively as a wearable controller for an external device, such as a smartphone or other mobile terminal equipment, for example.

Additionally, a controller according to several embodiments of the present disclosure includes, in addition to a finger shape detection function using optical sensors in the hand, a function of three-axis acceleration sensing and three-axis gyro sensing enabling the detection of the motion of the hand as a whole. If these functions are utilized, it is possible to realize text input through typing actions on a virtual keyboard by a machine learning process on the console device side, for example. In this case, for example, a keyboard row is specified in accordance with the amount of finger curl, and a keyboard column is specified by the finger direction, and keystrokes are executed by the recognition of a tap action with a finger, or by an operation such as pressing a certain button.

Further, for example, operating input may be executed by moving a fingertip in midair in the shape of a letter or symbol with a finger gesture recognition process paired with a machine learning process on the console device side. A letter or symbol may be input with a unicursal line, or may be input by being broken up into multiple parts by some operation. Such handwriting input is also possible by detecting the acceleration of the hand, for example, but in several embodiments of the present disclosure, handwriting input may be detected with just the motion of a finger, and thus the areas other than the finger may be kept still, without having to make unnecessarily large movements with the hand, for example.

Note that the input of a letter or symbol as above may also be combined with user authentication. For example, when the user executes the input of a letter or symbol with a certain finger shape (such as by holding up only three fingers, for example), the letter or symbol may be recognized as input for login. For example, if letters or symbols input as a result of the user moving his or her fingertips in midair match letters or symbols preregistered in the console device, the console device may allow the login of the user. Note that the console device in this case is not limited to being a stationary device, and may also be a wearable device (such as eyewear or wristwear) or a mobile device, for example.

Additionally, in a controller according to several embodiments of the present disclosure, movement or scrolling operations in two dimensions are possible by detecting an average value of the amount of finger curl (hereinafter also designated the curl center of gravity). For example, in a case in which the amount of finger curl is detectable for the four fingers from the index finger to the little finger, if just the index finger and/or the middle finger curl, the curl center of gravity is biased to the index finger side. Conversely, if just the little finger and/or the ring finger curl, the curl center of gravity is biased to the little finger side. This bias may be utilized to enable movement or a scrolling operation in a direction at a right angle to the fingers. Also, if all of the fingers are curled, the curl center of gravity is biased to the base-of-finger side, whereas if all of the fingers are opened, the curl center of gravity is biased to the fingertip side. This bias may be utilized to enable movement or a scrolling operation in a direction parallel to the fingers. Movement or a scrolling operation executed in this way may be utilized for the movement of a display area, a pointer icon, or the like on eyewear or wristwear, for example.

Additionally, since a controller according to several embodiments of the present disclosure has a separated configuration between the left and right hands, in the form of being worn on the hand, the controller may be used in a free style. Consequently, in the case of application to a game controller, for example, despite including a finger gesture recognition function, the controller may be used to play a game casually, without having to choose a location or attitude.

Additionally, a controller according to several embodiments of the present disclosure, although not covering the entire hand, is shaped to be worn on the hand. Consequently, it is possible to input finger gestures and switch between gesture input and button input quickly, without the controller falling from one's hand.

Additionally, in a controller according to several embodiments of the present disclosure, differently shaped left and right controllers (for example, the controllers 100A to 100C described in the first embodiment above) may be combined freely and used in association with a shared user ID. In this case, different controllers may be used depending on the application, such as using a left controller with a stick (for example, the controller 100A) for games, or using both left and right controllers specialized for finger gesture recognition (for example, the controller 100B) for a home information terminal appliance, for example.

Additionally, in a controller according to several embodiments of the present disclosure, an ultrasonic sensor capable of transmitting and receiving is built into each of the left and right controllers. In this case, it is possible to detect that the hand wearing the controller is approaching an object, for example. Further, for example, when the controller approaches a device with an ultrasonic sensor similarly built in, the distance and the direction to that device may be recognized, for example. In this way, input other than finger gestures and switches is realized, for example. Furthermore, it is also possible to hold up either the left or the right controller to another device compatible with the ultrasonic sensor, and conduct data communication using ultrasonic waves.

Additionally, in a controller according to several embodiments of the present disclosure, an optical sensor capable of transmitting and receiving (which may be a different sensor from the optical sensor 1031 in the first embodiment and the like above) is built into each of the left and right controllers. In this case, it is possible to hold up either the left or the right controller to another device compatible with the optical sensor, and conduct data communication using light, for example.

Additionally, in a controller according to several embodiments of the present disclosure, a microphone and a speaker capable of transmitting and receiving are built into each of the left and right controllers. In this case, it is possible to hold up either the left or the right controller to another device compatible with the microphone and speaker, and conduct data communication using audible sound, for example. Further, for example, it is possible to realize a phone-like function of executing sound input by speaking into a controller worn on one hand while also listening to sound output from the controller worn on the other hand. Further, for example, by combining the above with finger gesture recognition, it is possible to perform actions such as launching a voice communication application by making a shape in which only the thumb and the little finger are extended while the other fingers are closed (a finger gesture indicating a telephone).

Additionally, a controller according to several embodiments of the present disclosure includes a built-in pressure sensor in the grip member, thereby enabling measurement of grip strength. In this case, it is possible to realize gripping operations, such as "grip lightly" and "grip tightly", for example.

Additionally, since a controller according to several embodiments of the present disclosure is able to detect finger shape optically, it is not necessary to wear sensors on the fingertips, leaving the fingertips free. Consequently, even while wearing the controller on the hand, operations may be executed on other devices, such as a keyboard, mouse, or touch panel, for example.

Additionally, with a controller according to several embodiments of the present disclosure, for operations such as changing slides during a presentation, it is possible to execute multiple operations with gestures without looking at one's hands. Also, in the range in which communication is possible with the console device, there are no limitations on the detection range, and thus it is possible to continue operations even if one turns one's back to a screen, moves, or changes the direction of one's standing attitude.

Additionally, by wearing a controller according to several embodiments of the present disclosure while playing sports such as golf or swimming, information such as the motion and grip pressure of the hands, the motion of the fingertips, and the like may be detected by the built-in motion sensor (for example, the IMU 131 in the first embodiment). Additionally, it may also be possible to exchange data with another device by short-range communication using light, audible sound, or ultrasonic waves, for example. In this case, a function such as presenting advice for improving the sport may be realized by analyzing recorded data.

Additionally, by wearing a controller according to several embodiments of the present disclosure while cooking, information such as the motion and grip pressure of the hands, the motion of the fingertips, and the like may be detected by the built-in motion sensor (for example, the IMU 131 in the first embodiment). Additionally, it may also be possible to exchange data with another device by short-range communication using light, audible sound, or ultrasonic waves, for example. In this case, a function such as presenting advice for improving one's cooking may be realized by analyzing recorded data.

Additionally, by wearing a controller according to several embodiments of the present disclosure while playing a musical instrument, information such as the motion and grip pressure of the hands, the motion of the fingertips, and the like may be detected by the built-in motion sensor (for example, the IMU 131 in the first embodiment). Additionally, it may also be possible to exchange data with another device by short-range communication using light, audible sound, or ultrasonic waves, for example. In this case, a function such as presenting advice for improving one's playing of the musical instrument may be realized by analyzing recorded data.

Additionally, a controller according to several embodiments of the present disclosure is able to measure blood flow in the fingers by using a built-in optical sensor (which may be the same sensor as the optical sensor 1031 in the first embodiment and the like above, or a different sensor). In this case, for example, it is possible to measure the heart rate, which is one of the user's vital signs, and as an application, the user's health may be managed, or the changes in user's bodily and emotional state may be estimated. As a result, the controller may be utilized as healthcare equipment, or vital signs may be applied to controller operations.

Additionally, in the case of applying a controller according to several embodiments of the present disclosure to a game controller device, for example, operating input that uses the fingers as parameters, which is not found in other types of controllers such as game pads, is possible. More specifically, in a baseball game, for example, the flight of a pitched ball may be varied in accordance with how one grips the ball or throws one's hand. Further, for example, in a fantasy game, magic may be cast with motions of the fingers. Further, for example, in a fighting game, the speed of a punch may be varied in accordance with how tightly the fingers are clenched, and special moves involving various hand shapes, such as backhand strikes and chops, may also be introduced.

Further, for example, a controller according to several embodiments of the present disclosure may also be used in combination with another wearable device, such as a head-mounted device (for example, a head-mounted display). For example, even in cases in which the user wears a head-mounted display and is unable to see the controllers worn on the left and right hands, with the controllers as described above, it is possible to execute operations without looking at one's hands by finger shape recognition, assigning an operable element to each finger, or the like. Thus, operations may still be performed without impediment.

For example, in the case of combining the controller with a head-mounted device, a greater variety of user states may be detected by utilizing the attitude information of the head-mounted device or an image acquired by a camera provided on the head-mounted device. For example, on the basis of the attitude information of the head-mounted device, the facing (forward direction) of the user's head may be specified. In other words, the forward direction may be specified without prior calibration. Furthermore, from the position and direction of the user's arms appearing in an image acquired by the camera of the head-mounted device, it is possible to specify the direction in which the arms are extended. If this information is combined with the attitude of the hands detected by the controllers, the user's upper-body pose may be estimated. As a result, for example, a graphic or the like mimicking the hands at positions corresponding to the actual positions of the hands may be displayed in an image of a virtual space provided by the head-mounted device. By adding gloves or other accessories to this graphic, it is possible to dress up the hands virtually. Also, by recognizing the direction in which the arms are extended, a selection operation of taking an object placed in the virtual space or the like becomes possible. Additionally, it becomes possible to recognize gestures combining not just the attitude of the hand, but also the shape of the entire arm.

Furthermore, in the above example, a greater variety of motion may be detected by recognizing the motion of the head-mounted device as the motion of a physical experience. For example, if a synchronized up-and-down motion is detected by both the head-mounted device and the controllers worn on the hands, it is estimated that the user is jumping. Also, if an up-and-down motion is detected by the head-mounted device while a forward-and-back motion is detected by the controllers worn on the hands, it is estimated that the user is running. Also, if a downward motion is detected by both the head-mounted device and the controllers worn on the hands, and in addition, a light shock is detected by the controllers, it is estimated that the user has crouched down with his or her hands on the floor. Also, if it is detected that the user is looking down while pressing both hands to his or her head, it is estimated that the user is holding one's head in one's hands.

Further, for example, a controller according to several embodiments of the present disclosure, by synchronizing acceleration with other devices, is utilized to specify which device the user's hand is touching. For example, if the user presses down on a touch panel of a tablet with a hand wearing the controller, the accelerations detected respectively by the controller and the tablet are synchronized. In this case, the user wearing the controller is specified as the user of the tablet, and the tablet may allow the login of the user. Further, for example, if two users shake hands with each other while each is wearing the controller on the hand, the accelerations detected by each of the controllers are synchronized. In this case, a process of associating the users wearing the respective controllers, such as for building a team or pairing off as opponents, for example, may be executed. Further, for example, if two users give each other a high five or the like while each is wearing the controller on the hand, the accelerations detected by each of the controllers likewise are synchronized. In this case, a process of associating the users wearing the respective controllers, such as for exchanging an item, for example, may be executed. Also, if the user writes on a white board (interactive white board) with the hand wearing the controller, the accelerations detected respectively by the controller and the white board are synchronized. In this case, the user wearing the controller is specified as the user writing on the white board, and display color of the writing on the white board may be changed, for example.

Further, for example, a controller according to several embodiments of the present disclosure may also include a function in which, when the user grasps an object having an embedded communication tag with a hand wearing the controller, the controller recognizes the object by contactless communication. Such a function is realized by ultrasonic communication, infrared communication, or communication using an integrated chip (IC) tag, for example. More specifically, if the user holds a pen with a built-in tag, for example, the pen may be recognized as an input tool for a tablet or the like. Further, for example, if the user holds a light such as a flashlight, a virtual space inside a game or the like may become brighter due to the use of the light. Further, for example, if the user grips an object such as a figurine or a medal associated with a game character or the like, the relevant character may appear in the virtual space.

Further, for example, a controller according to several embodiments of the present disclosure may also include a function of extending the touch panel on a smartphone, tablet, or the like. For example, if a camera provided on the face on the touch-panel side of the smartphone or tablet is utilized, an image of the hand wearing the controller may be acquired. From this image, the relative position of the hand with respect to the touch panel may be specified. Meanwhile, in the controller, it is possible to detect from the shape of the fingers whether or not the user is performing an action of touching the touch panel. If this information is combined, even if the user executes a virtual touch action on an object displayed on the touch panel in a space distant from the touch panel, it is possible to detect the action as a touch operation on the touch panel. As a result, it becomes possible to execute touch panel operations without actually touching the touch panel, for example. Also, operations in the depth direction of the touch panel become possible.

Additionally, as a more specific example of an operation combining a hand sign recognized by finger shape detection and sound input, if the user utters "Shh" while holding up the index finger to his or her lips, the volume of output sound may be lowered in accordance with the length of the duration of the utterance. Further, for example, in a case in which the spatial coordinates of external devices to be operated are entered into a database in advance, and the positional relationship between the controller and external equipment is specified by information such as a finger direction, a body direction, and a gaze direction, an operation on a certain piece of external equipment (a cue operation with respect to the external equipment) may be executed by extending just one's index finger towards the external equipment.

Further, for example, a controller according to several embodiments of the present disclosure may also include a function of detecting the pressure when a finger pushes an object, by a pressure sensor or the like attached at the base of the finger, for example. In this case, by detecting the pushing of the object by the finger and the pushing force at that time, it is possible to detect operations such as touches, flicks, and swipes, as well as information such as the pressing magnitude in a touch operation, with respect to a face of an object that is not a touch panel.

Additionally, in another embodiment, the non-contact sensor unit that detects the shape of the fingers may also be worn at the base of the fingers. For example, the non-contact sensor unit may also be worn by a ring-shaped mounting member around the base of the thumb. In this case, for example, the non-contact sensor unit may also include a single sensor disposed on the inner side with respect to the curl direction of the thumb. Alternatively, the non-contact sensor unit may also include a sensor array made up of multiple sensors disposed at certain intervals in the circumferential direction of the thumb. These one or multiple sensors may detect the degree of curl and extension of the thumb, and additionally detect the spacing between the thumb and an adjacent finger (for example, the index finger). Also, a similar non-contact sensor unit may be worn around the base of the index finger. In this case, one or multiple sensors may detect the degree of curl and extension of the index finger, and additionally detect the spacing between the index finger and adjacent fingers (for example, the thumb and the middle finger). The spacing between fingers may be detected by pointing the direction of light emission and light incidence of the optical sensor toward the outside from the perspective of the index finger (or the thumb).

Also, in another embodiment, a command may also be issued on the basis of, in addition to a detection value from a non-contact sensor that detects the shape of the fingers, a detection value from an acceleration sensor, an angular velocity sensor, a geomagnetic sensor, an illumination sensor, a temperature sensor, a barometric sensor, a sound sensor (microphone), a biosensor that detects the user's biological information (such as heart rate, brain waves, or perspiration, for example), and/or a gaze detection sensor, and/or a speech recognition result. Furthermore, the display of an object on a display unit may also be controlled by an issued command. In this case, the object expresses the hand of a character or the like, for example. By controlling the hand of a virtually displayed object with a command based on detection information including information such as the shape of the fingers, a sense of realism may be felt due to the display of the object, for example.

5. Hardware Configuration

Figure 11:
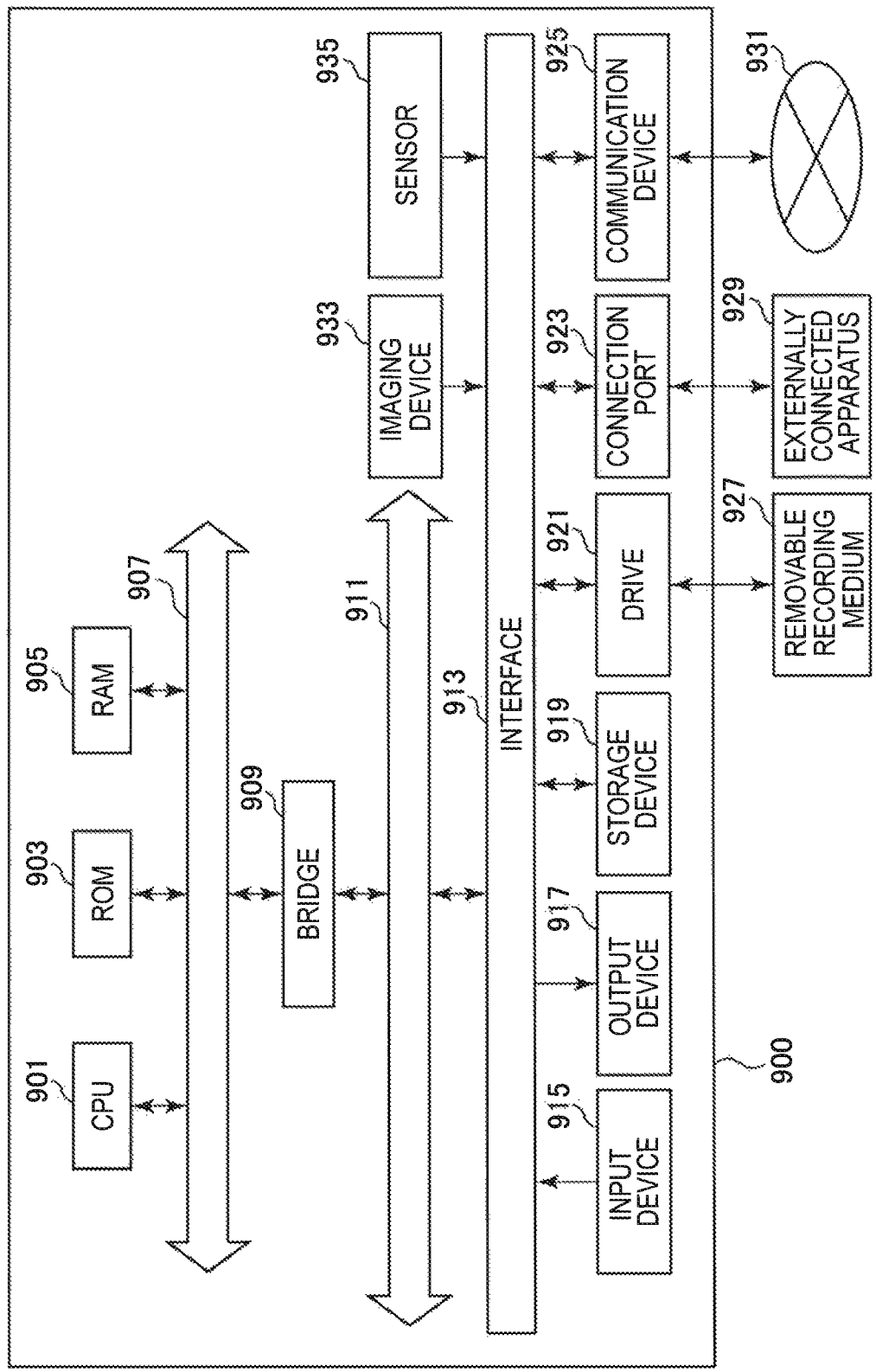
FIG. 11 is a block diagram illustrating an example hardware configuration of an information processing device according to an embodiment of the present disclosure.

Next, with reference to FIG. 11, a hardware configuration of an information processing apparatus according to the embodiment of the present disclosure is explained. FIG. 11 is a block diagram illustrating a hardware configuration example of the information processing apparatus according to the embodiment of the present disclosure. The illustrated information processing device 900 may realize a device such as the controller, console device, application device, wearable device, and/or server device in the foregoing embodiments, for example.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include an imaging apparatus 933, and a sensor 935, as necessary. The information processing apparatus 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing apparatus 900 in accordance with various programs recorded in the ROM 903, the RAM 905, the storage apparatus 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. In addition, the host bus 907 is connected to the external bus 911 such as a Peripheral Component Interconnect/Interface (PCI) bus via the bridge 909.

The input apparatus 915 is a device operated by a user such as a mouse, a keyboard, a touch panel, a button, a switch, and a lever. The input apparatus 915 may be a remote control device that uses, for example, infrared radiation and another type of radiowave. Alternatively, the input apparatus 915 may be an external connection apparatus 929 such as a mobile phone that corresponds to an operation of the information processing apparatus 900. The input apparatus 915 includes an input control circuit that generates input signals on the basis of information which is input by the user to output the generated input signals to the CPU 901. The user inputs various types of data to the information processing apparatus 900 and instructs the information processing apparatus 900 to perform a processing operation by operating the input apparatus 915.

The output apparatus 917 includes an apparatus that can report acquired information to the user visually, audibly, or haptically. The output apparatus 917 may be, for example, a display device such as a liquid crystal display (LCD) or an organic electro-luminescence (EL) display, an audio output apparatus such as a speaker or a headphone, or a vibrator. The output apparatus 917 outputs a result obtained through a process performed by the information processing apparatus 900, in the form of video such as text and an image, sounds such as voice and audio sounds, or vibration.

The storage apparatus 919 is an apparatus for data storage that is an example of a storage unit of the information processing apparatus 900. The storage apparatus 919 includes, for example, a magnetic storage device such as a hard disk drive (HDD), a semiconductor storage device, an optical storage device, or a magneto-optical storage device. The storage apparatus 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing apparatus 900. The connection port 923 may include, for example, a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing apparatus 900 and the external connection device 929.

The communication apparatus 925 is a communication interface including, for example, a communication device for connection to a communication network 931. The communication apparatus 925 may be, for example, a communication card for a local area network (LAN), Bluetooth (registered trademark), Wi-Fi, or a wireless USB (WUSB). The communication apparatus 925 may also be, for example, a router for optical communication, a router for asymmetric digital subscriber line (ADSL), or a modem for various types of communication. For example, the communication apparatus 925 transmits and receives signals in the Internet or transmits signals to and receives signals from another communication device by using a predetermined protocol such as TCP/IP. The communication network 931 to which the communication apparatus 925 connects is a network established through wired or wireless connection. The communication network 931 may include, for example, the Internet, a home LAN, infrared communication, radio communication, or satellite communication.

The imaging apparatus 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging apparatus 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing apparatus 900 such as a posture of a housing of the information processing apparatus 900, and information regarding an environment surrounding the information processing apparatus 900 such as luminous intensity and noise around the information processing apparatus 900. The sensor 935 may include a global positioning system (GPS) receiver that receives GPS signals to measure latitude, longitude, and altitude of the apparatus.

The example of the hardware configuration of the information processing apparatus 900 has been described. Each of the structural elements described above may be configured by using a general purpose component or may be configured by hardware specialized for the function of each of the structural elements. The configuration may be changed as necessary in accordance with the state of the art at the time of working of the present disclosure.

6. Supplement

The embodiments of the present disclosure may include, for example, the above-described information processing apparatus (controller, console device, application device, wearable device, and/or server device), the above-described system, the information processing method executed by the information processing apparatus or the system, a program for causing the information processing apparatus to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A detection device, including:

a non-contact sensor unit that detects a shape of a finger; and a mounting unit that mounts the non-contact sensor unit on a hand at a more distal position than a carpal area.

(2)

The detection device according to (1), in which the mounting unit mounts the non-contact sensor unit on a palm side of the hand.

(3)

The detection device according to (2), in which the mounting unit includes a grip member gripped by the hand.

(4)

The detection device according to (2) or (3), in which the non-contact sensor unit includes an optical sensor.

(5)

The detection device according to (4), in which the non-contact sensor unit includes a sensor array disposed on the palm side of the hand, and the sensor array includes one or a plurality of non-contact sensors respectively corresponding to one or a plurality of the fingers.

(6)

The detection device according to any one of (1) to (5), further including:

an attitude sensor that detects an attitude of the hand.

(7)

The detection device according to any one of (1) to (6), further including:

a motion sensor that detects a motion of the hand.

(8)

The detection device according to any one of (1) to (7), further including:

an operable element that detects an operation by the hand or the finger.

(9)

The detection device according to any one of (1) to (8), further including:

a sound sensor that detects a sound produced near the hand.

(10)

The detection device according to any one of (1) to (9), further including:

an output unit that outputs a result of a process based on the shape of the finger.

(11)

The detection device according to (10), in which the output unit includes a vibrator that transmits a vibration to a fingertip and a palm of the hand.

(12)

The detection device according to (11), in which the vibrator includes a low-frequency vibrator that transmits a low-frequency vibration to the fingertip and the palm of the hand, and a high-frequency vibrator that transmits a high-frequency vibration to the fingertip and the palm of the hand, and the mounting unit mounts the low-frequency vibrator at a position closer to an index finger, and mounts the high-frequency vibrator at a position closer to a little finger.

(13)

A detection method, including:

mounting, by a mounting unit, a non-contact sensor unit on a hand at a more distal position than a carpal area; and detecting, by the non-contact sensor unit, a shape of a finger.

(14)

A control device, including:

an acquisition unit that acquires a signal indicating a shape of a finger, the signal being detected by a non-contact sensor unit mounted on a hand at a more distal position than a carpal area; and a command issuing unit that issues a command corresponding to the shape of the finger.

(15)

The control device according to (14), in which the acquisition unit additionally acquires a signal indicating an attitude of the hand, a motion of the hand, an operation by the hand or the finger, or a sound produced near the hand, and the command issuing unit issues the command corresponding to the attitude of the hand, the motion of the hand, the operation by the hand or the finger, or the sound produced near the hand.

(16)

The control device according to (14) or (15), further including:

a transmission unit that transmits the command to a detection device provided with the non-contact sensor unit.

(17)

The control device according to (16), in which the command issuing unit issues a control command of a vibrator included in an output unit provided in the detection device.

(18)

The control device according to (14) or (15), further including:

a transmission unit that transmits the command to a device different from a detection device provided with the non-contact sensor unit.

(19)

The control device according to (14) or (15), further including:

the non-contact sensor unit and an output unit, in which the acquisition unit internally acquires a signal indicating a shape of a finger, and the command issuing unit issues a control command of the output unit.

(20)

A control method, including:

acquiring a signal indicating a shape of a finger, the signal being detected by a non-contact sensor unit mounted on a hand at a more distal position than a carpal area; and issuing, by a processor, a command corresponding to the shape of the finger.

REFERENCE SIGNS LIST 10 system
100 controller
101 grip member
103 sensor array
1031 optical sensor
105 lamp
107 stick
109 wheel
111 push button
113 select lever
115 grip button
117 backpack
119 speaker
121 belt
123 microphone
125 flick lever
131 IMU
133 vibrator
200 console device
205 finger shape recognition engine
207 attitude recognition engine
211 communication driver
215 command transmission and reception unit
300 application device
301 motion recognition engine
303 input device driver
305 sound driver
400 wearable terminal
401 frame
403 sensor array
405 housing
407 display

The invention claimed is:

1. A detection device, comprising:
a non-contact sensor unit that detects a shape of a finger;
a mounting unit that mounts the non-contact sensor unit on a hand at a more distal position than a carpal area; and
an output device that outputs a result of a process based on the shape of the finger,
wherein the output device includes a vibrator that transmits a vibration to a fingertip and a palm of the hand,
wherein the vibrator includes a low-frequency vibrator that transmits a low-frequency vibration to the fingertip and the palm of the hand, and a high-frequency vibrator that transmits a high-frequency vibration to the fingertip and the palm of the hand, and
wherein the mounting unit mounts the low-frequency vibrator at a position closer to an index finger along an axis transverse to a width of the hand, and mounts the high-frequency vibrator at a position closer to a little finger along the axis transverse to the width of the hand.

2. The detection device according to claim 1, wherein the mounting unit mounts the non-contact sensor unit on a palm side of the hand.

3. The detection device according to claim 2, wherein the mounting unit includes a grip member gripped by the hand.

4. The detection device according to claim 1, wherein the non-contact sensor unit includes a sensor array including a plurality of non-contact sensors respectively corresponding to a plurality of fingers, and
wherein the plurality of non-contact sensors are optical sensors, each of the optical sensors including a light-emitting unit and a light-sensing unit.

5. The detection device according to claim 4, wherein each of the optical sensors measures a ratio of light emitted from the light-emitting unit that reflects off a target object and is incident on the light-sensing unit.

6. The detection device according to claim 4, wherein the sensor array is disposed on a palm side of the hand.

7. The detection device according to claim 1, further comprising:
an attitude sensor that detects an attitude of the hand.

8. The detection device according to claim 1, further comprising:
a motion sensor that detects a motion of the hand.

9. The detection device according to claim 1, further comprising:
a structural element configured to be moveable by the hand or the finger to detect an operation by the hand or the finger.

10. The detection device according to claim 1, further comprising:
a sound sensor that detects a sound produced near the hand.

11. The detection device according to claim 3, wherein the mounting unit mounts the low-frequency vibrator at a position in the grip member closer to an index finger, and mounts the high-frequency vibrator at a position in the grip member closer to a little finger.

12. A detection method, comprising:
mounting, by a mounting unit, a non-contact sensor unit on a hand at a more distal position than a carpal area;
detecting, by the non-contact sensor unit, a shape of a finger;
outputting, by an output device, a result of a process based on the shape of the finger,
wherein the output device includes a vibrator that transmits a vibration to a fingertip and a palm of the hand, and
wherein the vibrator transmits a low-frequency vibration to the fingertip and the palm of the hand by utilizing includes a low-frequency vibrator, and transmits a high-frequency vibration to the fingertip and the palm of the hand by utilizing a high-frequency vibrator; and
mounting, by the mounting unit, the low-frequency vibrator at a position closer to an index finger along an axis transverse to a width of the hand, and the high-frequency vibrator at a position closer to a little finger along the axis transverse to the width of the hand.

13. A control device, comprising:
an acquisition unit that acquires a signal indicating a shape of a finger, the signal being detected by a non-contact sensor unit mounted on a hand at a more distal position than a carpal area;
a command issuing unit that issues a command corresponding to the shape of the finger;
an output device that outputs a result of a process based on the shape of the finger,
wherein the output device includes a vibrator that transmits a vibration to a fingertip and a palm of the hand,
wherein the vibrator includes a low-frequency vibrator that transmits a low-frequency vibration to the fingertip and the palm of the hand, and a high-frequency vibrator that transmits a high-frequency vibration to the fingertip and the palm of the hand; and
a mounting unit that mounts the low-frequency vibrator at a position closer to an index finger along an axis transverse to a width of the hand, and mounts the high-frequency vibrator at a position closer to a little finger along the axis transverse to the width of the hand, and
wherein the acquisition unit and the command issuing unit are each implemented via at least one processor.

14. The control device according to claim 13, wherein the acquisition unit additionally acquires a signal indicating an attitude of the hand, a motion of the hand, an operation by the hand or the finger, or a sound produced near the hand, and
the command issuing unit issues the command corresponding to the attitude of the hand, the motion of the hand, the operation by the hand or the finger, or the sound produced near the hand.

15. The control device according to claim 13, further comprising:
a transmission unit that transmits the command to a detection device provided with the non-contact sensor unit,
wherein the transmission unit is implemented via at least one processor.

16. The control device according to claim 15, wherein the command issuing unit issues a control command of a vibrator included in an output device provided in the detection device.

17. The control device according to claim 13, further comprising:
a transmission unit that transmits the command to a device different from a detection device provided with the non-contact sensor unit,
wherein the transmission unit is implemented via at least one processor.

18. The control device according to claim 13, further comprising:
the non-contact sensor unit and an output device,
wherein the acquisition unit internally acquires a signal indicating a shape of a finger, and
wherein the command issuing unit issues a control command of the output device.

19. A control method, comprising:
acquiring a signal indicating a shape of a finger, the signal being detected by a non-contact sensor unit mounted on a hand at a more distal position than a carpal area; and
issuing, by a processor, a command corresponding to the shape of the finger;
outputting, by an output device, a result of a process based on the shape of the finger,
wherein the output device includes a vibrator that transmits a vibration to a fingertip and a palm of the hand, and
wherein the vibrator transmits a low-frequency vibration to the fingertip and the palm of the hand by utilizing includes a low-frequency vibrator, and transmits a high-frequency vibration to the fingertip and the palm of the hand by utilizing a high-frequency vibrator; and
mounting, by a mounting unit, the low-frequency vibrator at a position closer to an index finger along an axis transverse to a width of the hand, and the high-frequency vibrator at a position closer to a little finger along the axis transverse to the width of the hand.

* * * * *